(12) United States Patent
Murakami et al.

(10) Patent No.: US 6,778,228 B2
(45) Date of Patent: Aug. 17, 2004

(54) PROJECTION-TYPE DISPLAY APPARATUS

(75) Inventors: Osamu Murakami, Suwa (JP); Akitaka Yajima, Suwa (JP); Yoshitaka Itoh, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/217,606

(22) Filed: Aug. 14, 2002

(65) Prior Publication Data

US 2003/0025845 A1 Feb. 6, 2003

Related U.S. Application Data

(63) Continuation-in-part of application No. 09/082,534, filed on May 21, 1998, now Pat. No. 6,529,250.

(30) Foreign Application Priority Data

| May 22, 1997 | (JP) | ............................................. 9-132621 |
| Aug. 25, 1997 | (JP) | ............................................. 9-228343 |
| May 20, 1998 | (JP) | ......................................... 10-138908 |

(51) Int. Cl.⁷ ........................ G02F 1/1335; G03B 21/14
(52) U.S. Cl. ............................. 349/5; 349/96; 349/119; 353/38
(58) Field of Search ........................ 349/5, 9, 96, 119; 353/38, 20, 37, 31

(56) References Cited

U.S. PATENT DOCUMENTS

| 5,237,436 A | * | 8/1993 | Khan et al. .................... 349/42 |
| 5,535,054 A | | 7/1996 | Shibuya ....................... 395/487 |
| 5,626,409 A | * | 5/1997 | Nakayama et al. ............ 353/31 |
| 5,686,979 A | * | 11/1997 | Weber et al. .................. 349/96 |
| 5,844,637 A | * | 12/1998 | Katsumata ..................... 349/8 |
| 5,865,521 A | | 2/1999 | Hashizume et al. .......... 353/38 |
| 5,959,773 A | | 9/1999 | Gagnon ....................... 359/495 |
| 5,991,077 A | | 11/1999 | Carlson et al. ............. 359/500 |
| 6,025,897 A | | 2/2000 | Weber et al. ................. 349/96 |
| 6,088,067 A | | 7/2000 | Willett et al. .................. 349/5 |
| 6,147,802 A | | 11/2000 | Itoh et al. ...................... 349/5 |
| 6,152,566 A | * | 11/2000 | Hashizume ..................... 349/9 |
| 6,529,250 B1 | * | 3/2003 | Murakami et al. ............. 349/5 |

FOREIGN PATENT DOCUMENTS

| JP | 08-304739 | 8/1996 |
| WO | WO 95 17303 | 6/1995 |
| WO | WO 95 17691 | 6/1995 |
| WO | WO 95 17692 | 6/1995 |
| WO | WO 95 17699 | 6/1995 |
| WO | WO 95 27919 | 10/1995 |
| WO | WO 96 19347 | 6/1996 |
| WO | WO 97 01439 | 1/1997 |

(List continued on next page.)

*Primary Examiner*—Dung Nguyen
(74) *Attorney, Agent, or Firm*—Oliff & Berridge, PLC

(57) ABSTRACT

A projection-type display apparatus of the invention aiming at solving the problem of heat generation caused by absorption of light by a polarizing means of a liquid crystal light valve. To overcome this problem, the projection-type display apparatus of the invention includes a light source, a light valve for modulating the light from the light source, and a projection optical means for projecting the light modulated by the light valve, with the light valve including a liquid crystal panel and a polarizing means, provided on the light source side of the liquid crystal panel, and the polarizing means being formed of a multi-layered film which primarily transmits one of two types of polarization axis component light beams and primarily reflects the other of the two types of polarization axis component light beams.

15 Claims, 12 Drawing Sheets

FOREIGN PATENT DOCUMENTS

| | | |
|---|---|---|
| WO | WO 97 01440 | 1/1997 |
| WO | WO 97 01610 | 1/1997 |
| WO | WO 97 01726 | 1/1997 |
| WO | WO 97 01774 | 1/1997 |
| WO | WO 97 01778 | 1/1997 |
| WO | WO 97 01780 | 1/1997 |
| WO | WO 97 01781 | 1/1997 |
| WO | WO 97 01788 | 1/1997 |
| WO | WO 97 01789 | 1/1997 |
| WO | WO 97 07653 | 2/1997 |

* cited by examiner (A)

(B)

(A)

(B)

though a light guide that is designed to increase light usage efficiency is used, there is still not much increase in luminance of the projected image.

PROJECTION-TYPE DISPLAY APPARATUS

BACKGROUND OF THE INVENTION

1. Field of Invention

The present invention relates to a projection-type display apparatus (also called a liquid crystal projector) employing liquid crystal light valves composed of liquid crystal panels.

2. Description of Related Art

The liquid crystal projector 1100 of FIG. 9 is an example of a generally-used projection-type projector employing transmissive liquid crystal panels as light valves. In FIG. 9, light from a lamp unit 1102, serving as a light source, is reflected by a mirror 11061 and enters a light guide 1104 where the light is separated into three primary light beams, a red R light beam, a green G light beam, and a blue B light beam, by two dichroic mirrors 11081 and 11082. The blue B light beam, separated from the light by the dichroic mirror 11082, is reflected by a mirror 11062, and enters a liquid crystal light valve 1110B. The green G light beam, reflected by the dichroic mirror 11081, enters a liquid crystal light valve 1110G The red R light beam, transmitted through the dichroic mirror 11081, is reflected by two mirrors 11063, and enters a liquid crystal light valve 1110R.

The three light valves 1110R, 1110G, and 1110B are used for modulating the light beams incident thereto in accordance with their respective color image information in order to form an image. The light beams, modulated by the liquid crystal light valves 1110R, 1110G, and 1110B enter a dichroic prism 1112 from three directions. The dichroic prism 1112 consists of four right-angled prisms whose apices are brought into alignment and bonded together, with two types of wavelength selection reflecting films formed so as to form an X-shape along the bonded surfaces. Accordingly, the red R light beam is reflected by one of the two types of wavelength selection reflecting films towards a projection lens 1114. The blue B light beam is reflected by the other of the two types of wavelength selection reflecting films towards the projection lens 1114. The green G light beam transmits through the two types of wavelength selection reflecting films and arrives at the projection lens 1114. In other words, the images formed by the three liquid crystal light valves 1110R, 1110G, and 1110B, are synthesized by the dichroic prism 1112 in order to project the resultant image onto a projection surface of, for example, a screen through the projection lens 1114.

FIG. 10 is a schematic view of a liquid crystal light valve. Conventionally, as shown in FIG. 10, each of the liquid crystal light valves 1110R, 1110G, and 1110B consists of a liquid crystal panel 804, a light-incident side polarizer 803, and a light-emitting side polarizer 805, with the polarizer 803 being spaced from the light-incident surface of the liquid crystal panel 804 and the polarizer 805 being provided on the light-emitting surface of the liquid crystal panel 804.

In FIG. 10, reference numeral 803 denotes the light-incident side polarizer, which transmits, for example, a p-polarization axis component light beam 801 of the incident light (symbol ↔ in FIG. 10 represents the p-polarization axis) and absorbs an s-polarization axis component light beam 802 (symbol ⊙ in FIG. 10 represents the s-polarization axis). The p-polarized light beams 801, transmitted through the polarizer 803, enters the liquid crystal panel 804. The liquid crystal panel 804 is a twisted nematic (TN) type liquid crystal panel, which causes the p-polarized light beam 801, incident upon a pixel to which a voltage is not applied, to leave it as an s-polarized light beam 809 by rotating the polarization axis through an angle of about 90 degrees. On the other hand, the p-polarized light beam 801, incident upon a pixel to which a voltage is applied, leaves the liquid crystal panel 804 as a p-polarized light beam 808. Reference numeral 805 denotes the light-emitting side polarizer. When the polarization axis of the polarizer 805 is set to that allowing transmission of s-polarized light beams, the light beam 809, which has left the liquid crystal panel 804 as an s-polarized light beam, transmits through the polarizer 805 unchanged. On the other hand, when the light beam 808, which has left the liquid crystal panel 804 as a p-polarized light beam, is absorbed by the polarizer 805. In the liquid crystal panel 804, the proportion of liquid crystal twisting can be controlled by controlling the voltage applied to the liquid crystal for each pixel based on each color image information, making it possible to control the amount of rotation of the polarization axis of the light beam 801, transmitted through the light-incident side polarizer 803, which enters the liquid crystal panel 804. Thus, it is possible to control the quantity of light passing through the light-emitting side polarizer 805 for every pixel in order to form an image.

The path taken by the s-polarized light beam 802 is shown at the right side in FIG. 10. The s-polarized light beam 802 is absorbed by the light-incident side polarizer 803 and is converted into heat. The light beam 808, absorbed by the light-emitting side polarizer 805, is also converted into heat.

Conventional polarizers were of the type absorbing a non-transmissive polarization axis (hereinafter referred to as an absorptive-type polarizer), so that of the randomly polarized light beams illuminating a polarizer, approximately half of it is absorbed by the polarizer, and converted into heat, deteriorating the polarization characteristics of the polarizer. In addition, when the heat produced at the polarizer is transmitted to the light crystal panel 804, liquid crystal characteristics change, or a large quantity of leakage current flows at a thin film transistor (TFT) disposed at each pixel of the liquid crystal panel, resulting in display variations.

Therefore, in conventional projection-type display apparatuses, it is necessary, for example, to use a highly heat-resistant liquid crystal, since heat is generated as a result of absorption of about half of the incident light by the light-incident side polarizer of a liquid crystal light valve. In other words, it is necessary to use a liquid crystal with a high N-I point, since physical properties, such as the refractive index, the anisotropy of dielectric constant, or the elastic constant, of the liquid crystal change with temperature, and the change becomes greater the closer the transition point (the N-I point) is to the isotropic phase. At present, a high N-I point material is mixed with ten types of materials or so, so that within, for example, the threshold voltage or response speed range providing satisfactory performance, the liquid crystal material obtained has a high N-I point at a temperature equal to or greater than 100 degrees. Thus, liquid crystals become expensive, which causes liquid crystal panels to become expensive.

In addition, in order to make the image projected onto a screen brighter, there has been a trend, in recent years, to increase the luminance of a light source lamp, resulting in the problem of increased heat generation from the liquid crystal light valves. A cooling fan for cooling the light-incident side polarizer and the liquid crystal panels is provided in order to cool the liquid crystal light valves. The designing of such a cooling fan is sophisticated since, for example, the rotational speed or the size of the cooling fan must be made large.

Further, since about half of the light from the light source lamp is absorbed by the light-incident side polarizer and converted into heat, light is used with very low efficiency, preventing a bright display from being obtained.

SUMMARY OF THE INVENTION

Accordingly, in order to overcome the above-described problems of conventional devices, it is an object of the present invention to provide a projection-type display apparatus which reduces the amount of heat generated by a liquid crystal light valve, serving as a polarizing means, and maintains excellent liquid crystal light valve characteristics. It is also an object of the present invention to provide a projection-type display apparatus which allows light from a light source lamp to be used with high efficiency.

To overcome the above-described problems, according to the present invention, there is provided a first projection-type display apparatus comprising a light source, a separating means for separating light from the light source into a plurality of color lights, a plurality of light valves for modulating each of the color lights separated by the separating means, a synthesizing means for synthesizing the color lights modulated by the plurality of light valves, and a projection optical means for projecting the light synthesized by the synthesizing means, wherein each of the light valves includes a liquid crystal panel and a polarizing means provided on the light-incident side of its associated liquid crystal panel, and wherein each of the polarizing means is formed of a multi-layered film which primarily transmits one of two types of polarization axis component light beams and primarily reflects the other of the two types of polarization axis component light beams.

In addition, according to the present invention, there is provided a second projection-type display apparatus comprising a light source, a light valve for modulating light from the light source,; and a projection optical means for projecting the light modulated by the light valve, wherein the light valve includes a liquid crystal panel and a polarizing means provided on the light-incident side of the liquid crystal panel, the polarizing means being formed of a multi-layered film which primarily transmits one of two types of polarization axis component light beams and primarily reflects the other of the two types of polarization axis component light beams, the projection-type display apparatus further comprising a polarization converter, disposed between the light source and the polarizing means, for aligning the light beams from the light source with the one type of polarization axis component light beams to emit from the polarization converter.

Further, according to the present invention, there is provided a third projection-type display apparatus comprising a light source, a light valve for modulating light from the light source, and a projection optical means for projecting the light modulated by the light valve, wherein the light valve includes a liquid crystal panel and at least a polarizing means provided on the light-emitting side of the liquid crystal panel, the polarizing means being formed of a multi-layered film which primarily transmits one of two types of polarization axis component light beams and primarily reflects the other of the two types of polarization axis component light beams, and wherein the liquid crystal panel is formed by sandwiching a liquid crystal between a pair of substrates, a switching element and a pixel electrode connected to the switching element being formed in a matrix arrangement on the inside surface of the substrate provided on the light-emitting side of the pair of substrates, and a light-shielding layer being formed on the inside surface of the substrate having formed thereon the switching element.

Still further, according to the present invention, there is provided a fourth projection-type display apparatus comprising a light source lamp, a separating means for separating light from the light source lamp into a plurality of color lights, a plurality of light valves for modulating the color lights separated from the light by the separating means, a synthesizing means for synthesizing the color lights modulated by the plurality of light valves, and a projection optical means for projecting the light synthesized by the synthesizing means, wherein each of the light valves includes a liquid crystal panel, the projection-type display apparatus further comprising a polarizing means disposed between the light source lamp and the separating means, the polarizing means being formed of a multi-layered film which primarily transmits one of two types of polarization axis component light beams and primarily reflects the other of the two types of polarization axis component light beams, a reflecting means, disposed behind the light source lamp, for reflecting the light from the light source lamp and the light reflected by the polarizing means towards the polarizing means side, and a ¼ wavelength plate disposed between the reflecting means and the polarizing means.

Still further, according to the present invention, there is provided a fifth projection-type display apparatus comprising a separating means for separating the light from a light source into a plurality of color lights, a plurality of light valves for modulating the plurality of color lights separated from the light by the separating means, a synthesizing means for synthesizing the color lights modulated by the plurality of light valves, and a projection optical means for projecting the light synthesized by the synthesizing means, wherein the light valves include a liquid crystal panel and a polarizing means provided on the light-incident side of the liquid crystal panel associated thereto, each of the polarizing means being formed of a multi-layered film which primarily transmits one of two types of polarization axis component light beams and primarily reflects the other of the two types of polarization axis component light beams, and each of the polarizing means having a wavelength selective transmission characteristic set in such a manner as to allow selective transmission of the color lights modulated by its associated light valve.

A feature of the first through fifth projection-type display apparatuses of the present invention is that the polarizing means of each liquid crystal light valve is formed of a multi-layered film which primarily transmits one of two types of polarization axis component light beams and primarily reflects the other of the two types of polarization axis component light beams. In the present invention, such polarizing means is called either "reflective polarizing means" or "reflective polarizer". Since the amount of heat generated at such reflective polarizing means as a result of light absorption is less than that generated at conventional light absorptive-type polarizer, it is possible to prevent heat deterioration of polarizing characteristics of each polarizing means and heat influence on each liquid crystal panel. In addition, since each reflective polarizing means is a multi-layered film, it is only necessary to replace the conventional light absorptive-type polarizer with such reflective polarizing means, so that the size of the optical system is not increased. Further, the amount of heat produced is greatly reduced, so that in some cases the cooling means can be eliminated, or the cooling mechanism can be simplified, since, for example, it is no longer necessary to devise the cooling means in such a way as to increase its cooling efficiency. Still further, the polarization axis component light beams of the other type, reflected by each reflective polarizing means, are reflected at the light source, and as the beams pass through various optical members in the optical path, the polarization axis component light beams of the other type are converted into polarization axis component light beams that can transmit through each of the polarizing means. Therefore, when the reflected light beams re-enter the light-incident side polarizing means, at least part of the light reflected by the light-incident side polarizing means transmits through the liquid crystal panels to emit from them. Consequently, it is possible to use the light more efficiently than has been conventionally possible.

The multi-layered film forming its associated polarizing means of the projection-type display apparatus of the Embodiments 1 to 5 consists of alternate layers of first films and second films (described later), with the first films having a refractive index in a first axial direction of the film surface which differs from a refractive index in a second axial direction perpendicular thereto, and with the second films having a refractive index in the first axial direction and the second axial direction which is substantially equal to the refractive index of the first films in the second axial direction. This allows a flat polarizing means to be formed, so that the size of the projection-type display apparatus will not be large. In addition, in the present invention, the multi-layered film forming each of the polarizing means can be either adhered closely to or bonded to the outer surface of substrate of the associated liquid crystal panel. This makes it unnecessary to use a holding member for holding each polarizing means. It is to be noted that the polarizing means absorbs less light so that heat is not generated easily, making it unnecessary to worry about the possibility of heat affecting the liquid crystal panels.

According to the second projection-type display apparatus of the present invention, between the light source and the reflective polarizing means is provided a polarization converter which aligns a polarized light component, which becomes a reflection axis of the reflective polarizing means, with a polarization axis component which leave each of the reflective polarizing means. Therefore, most of the light from the light source transmits the each reflective light-incident side polarizing means, allowing not only even more efficient use of the light but also further reduction in the amount of heat generated at each polarizing means. The light component which could not be converted by the polarization converter can be used since the unconverted component is reflected back towards the polarization converter by each polarizing means.

According to the third projection-type display apparatus of the present invention, the above-described reflective polarizing means is used for the light-emitting side polarizing means of each liquid crystal light valve, allowing the polarization axis component of the light from each liquid crystal panel that cannot transmit through the polarizing means to be reflected back towards the light source through its associated liquid crystal panel, so that the light can be used more efficiently. When light is reflected from a light-emitting side polarizing means to its associated liquid crystal panel, a light-shielding film is provided on the light-emitting side of a switching element to prevent light from impinging upon the switching element, and, in particular, a thin-film transistor, so that even when a reflective polarizing means is used as a light-emitting side polarizing means, there is less deterioration in the liquid crystal panel characteristics. In other words, even when a reflective polarizing means is provided on the light-emitting side of a liquid crystal panel, it is possible to prevent reduced contrast caused by deterioration in the charge holding property of each pixel as a result of leakage current flowing through the silicon layer at a thin film transistor in each liquid crystal panel. Thus, deterioration in liquid crystal panel characteristics can be prevented, although using the light more efficiently.

According to the fourth projection-type display apparatus of the present invention, a ¼ wavelength plate is disposed in front of a reflective polarizing means. The polarization axis component light beams of the other type, reflected by the polarizing means, are converted into elliptic polarized light beams by the ¼ wavelength plate, and the elliptic polarized light beams enter and are reflected by the reflecting means at the light source lamp, and transmit through the ¼ wavelength plate again, whereby the elliptic polarized light beams are converted into one of two types of polarization axis component light beams. Therefore, since the light can, this time, enter the polarizing means, it is possible to increase the amount of light entering the color separating means. The reflective polarizing means is disposed in front of the separating means which separates the color lights from the light source, thereby shortening the optical distance between the reflecting means and the reflective polarizing means, and fewer optical members are disposed therebetween, making it possible to achieve a smaller reduction in the amount of light as a result of repeated reflection of the light therebetween. In addition, it is desirable to dispose a second polarizing means just in front the liquid crystal panels. The polarization axis of this polarizing means is set so as to allow transmission of the light that has transmitted through the reflective polarizing means disposed in front of the separating means. As the linearly polarized light which has transmitted through the reflective polarizing means passes the color separating means, part of the linearly polarized light is converted into the other of the two types of polarization axis component, so that the polarization axis component is blocked by the second polarizing means. The second polarizing means may either be a conventional light absorptive-type polarizer or a reflecting polarizer such as those described above.

According to the fifth projection-type display apparatus of the present invention, the wavelength selective transmission characteristics of the polarizing means of each light valve are set so as to allow selective passage of the color light modulated by its associated light valve, making it possible to provide a projection-type display apparatus which has a high color reproducibility and allows a highly pure color light to enter its associated light valve. In particular, in the fifth projection-type display apparatus, the multi-layered film provided on least at the light-incident side of each liquid crystal panel consists of alternate layers of first films and second films, with the first films having a refractive index in a first axial direction of the film surface which differs from a refractive index in a second axial direction perpendicular thereto, and the second films having a refractive index in the first axial direction and the second axial direction substantially equal to the refractive index of the first films in the second axial direction. The thickness of each film is set so as to allow selective transmission of the color light incident thereupon, and the multi-layered films of the light valves may have different thickness. This allows wavelength selection at the polarizing means provided on the light-incident side of each liquid crystal panel, thereby simplifying the structure without a separate member.

In the projection-type display apparatus of the present invention, light may be made to impinge substantially perpendicular to the light-incident surface of each multi-layered film. This allows the polarization axis component light beams of the other type from the films to be reflected towards the light source along the optical axis. The light reflected at the light source can be guided again along one optical axis towards the polarizing means. Therefore, the light, reflected at the films, can be used with even greater efficiency. In detail, an optical means for collimating light beams from the light source may be disposed between the light source and the multi-layered films such that light enters substantially perpendicularly to the light-incident surface of each multi-layered film. This causes the light from the light source to enter perpendicular to the polarizing means, so that even when the polarization axis component light beams of the other type are reflected, the amount of light leakage is reduced since the light beams are reflected perpendicularly to each light-incident surface and in directions different from the optical axis direction. Accordingly, the light beams are reflected in the optical axis direction of the light source, and reflected by the light source, so that the light can be used.

In the first projection-type display apparatus, a polarization converting means which converts the light beams from the light source into polarization axis component light beams which can transmit through the polarizing means may be disposed between the light source and the separating means. This allows the randomly polarized light beams from the light source to be converted into polarization axis component light beams which transmit through the polarizing means, so that almost all of the light beams from the light source transmit through the polarizing means, as a result of which the light can be used with even greater efficiency. In addition, a smaller amount of light reflected by the polarizing means reduces the amount of light returning towards the light source, so that problems such as light leakage caused by repeated interference and reflection by the light do not occur often.

According to the first, second, fourth, and fifth projection-type display apparatuses, in the case where each light valve includes a polarizing means at the light-emitting side of its associated liquid crystal panel, each polarizing means may be a multi-layered film which primarily reflects either one of two types of polarization axis components and primarily reflects the other of the two types of polarization axis components. In that case, it is possible to reduce the amount of heat generated at each light-emitting side polarizing means, and the light, reflected by each polarizing means, transmits through each liquid crystal panel and returns back towards the light source where it is reflected for use, as a result of which the light can be used efficiently.

According to the projection-type display apparatus of each of the present inventions, in the case where light, reflected from the polarizing means, is made to return back towards the light valves by means of the light source, it is preferable that the light source be constructed so as to comprise a reflecting mirror which reflects light beams returning from the separating means as substantially collimated light beams which leave therefrom; or a reflecting mirror which reflects light beams from the separating means and a condensing means which condenses and concentrates the light beams from the reflecting mirror into substantially collimated light beams which leave therefrom.

BRIEF DESCRIPTION OF THE DRAWINGS

FIG. 12(A) is a plan view of a liquid crystal panel in accordance with the present invention, while FIG. 12(B) is a view of an equivalent circuit diagram.

DETAILED DESCRIPTION OF PREFERRED EMBODIMENTS

A description will now be given of embodiments of the present invention, with reference to the drawings.

[Embodiment 1]

(Structure of Projection-type display apparatus)

Figure 1:
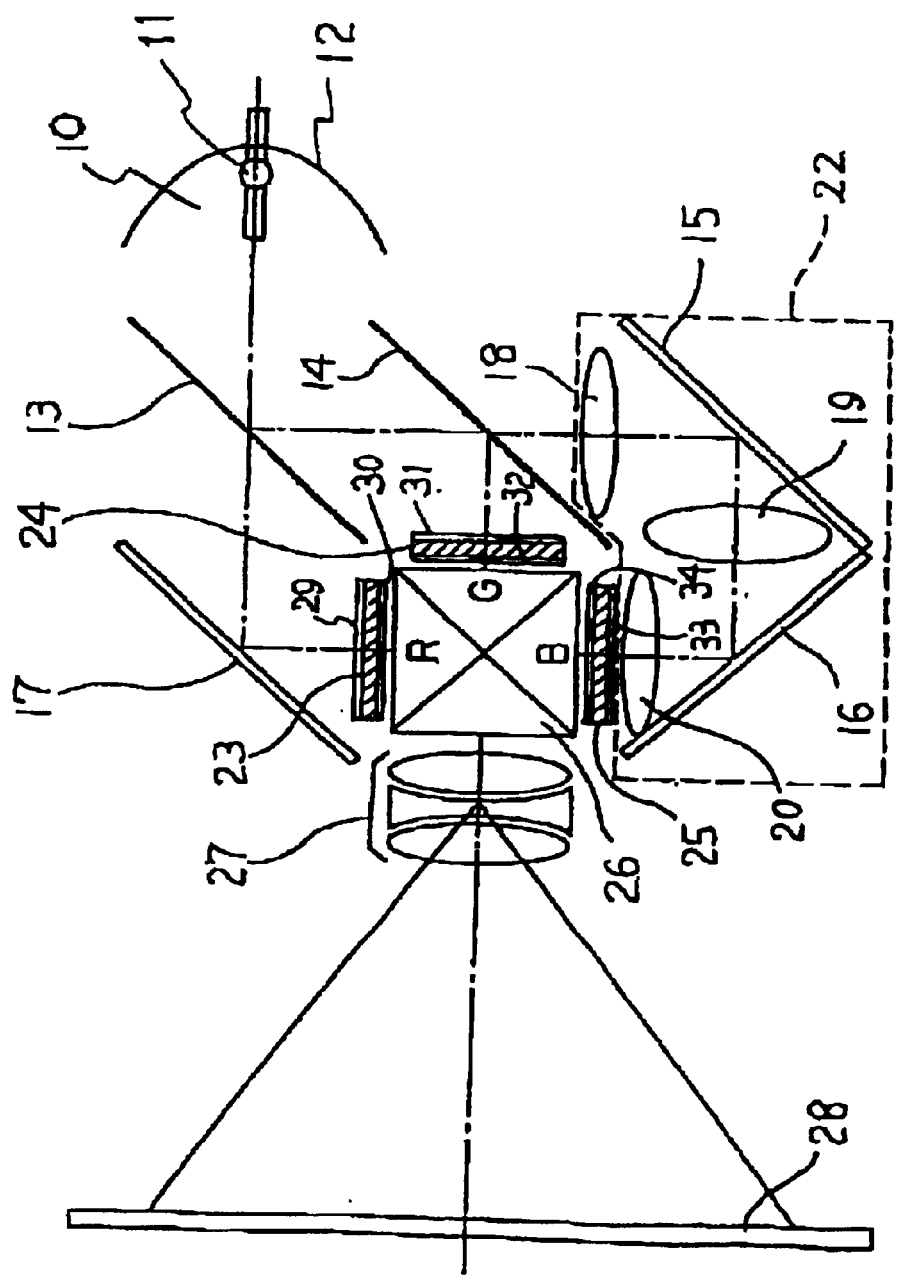
FIG. 1 is a view showing the structure of the projection-type display apparatus of Embodiment 1 in accordance with the present invention.

FIG. 1 is a schematic view of the structure of the main portion of the projection-type display apparatus of Embodiment 1. The projection-type display apparatus comprises a light source 10, dichroic mirrors 13 and 14, reflecting mirrors 15, 16, and 17, relay lenses 18, 19, and 20, three liquid crystal light valves (23, 29, 30), (24, 31, 32), and (25, 33, 34), a cross dichroic prism 26, and a projection lens 27.

The light source 10 includes a lamp 11, such as a mercury lamp or a metal halide lamp in which discharge occurs between two electrodes, and a reflecting mirror 12(or reflector) having a parabolic surface, such as a semi-circular or a semi-elliptical surface, which reflects light towards the dichroic mirror 13.

The dichroic mirrors 13 and 14 operate as color separating means which separate light from the light source into three color light beams, a red light beam, a blue light beam, and a green light-beam.

The first dichroic mirror 13, capable of separating a red light beam, transmits the red light component of the light from the light source 10 therethrough, and reflects the blue light component and the green light component. The red light beam, which has transmitted through the first dichroic mirror 13, is reflected by the reflecting mirror 17, and enters the red light liquid crystal light valve (23, 29, 30). Of the blue light beam and the green light beam reflected by the first dichroic mirror 13, the green light beam is reflected by the second dichroic mirror 14, and enters the green light liquid crystal light valve (24, 31, 32). On the other hand, the blue light beam transmits through the second dichroic mirror 14.

In the present embodiment, of the optical paths of the three color light beams, that of the blue light beam is the longest. For the blue light beam, a light-guiding means 22, comprising a relay lens system including a light-incoming lens 18, a relay lens 19, and a light-outgoing lens 20, is provided behind the second dichroic mirror 14 in order to reduce the amount of light loss as a result of reducing the optical distance. In other words, the blue light beam, which has transmitted through the second dichroic mirror 14 which reflects green light, is guided to the relay lens 19 through the light-incoming lens 18 and the reflecting mirror 15. Then, the blue light beam is reflected by the reflecting mirror 16 and guided to the light-outgoing lens 20, after which it enters the blue light liquid crystal light valve (25, 33, 34).

In accordance with image signals (image information) generated from an external control circuit (not shown), the three color light beams, which have entered their respective light valves, are modulated thereby and leave their respective light valves, with the light intensity being set for each pixel in accordance with the image information of each of the color components.

Of the component parts of each of the liquid crystal light valves, the liquid crystal panels 23, 24, and 25 each operate as a light-modulating means which modulates the color light beam incident thereupon in accordance with the associated image signal (image information), causing an image to be formed. Each of the liquid crystal panels consists of a pair of substrates with a TN (twisted nematic) type liquid crystal enclosed therebetween. The pixels are arranged in a matrix fashion, with a switching element, such as a two-terminal element (a MIM or the like) or a thin film transistor (TFT), and a pixel electrode, connected to the switching element, being disposed at each pixel. Describing a liquid crystal panel employing TFTs in more detail, scanning signal lines and data signal lines are placed so as to cross each other in a matrix-like arrangement on one of the substrates, thereby dividing the substrate into pixel areas where the TFTs and pixel electrodes are formed, with the gates of the TFTs being connected to the scanning signal lines, the sources of the TFTs being connected to the data signal lines, and the pixel electrodes being connected to the drains of the TFTs. On the other hand, opposing electrodes are formed on the other substrate. Image signals are applied to the pixel electrode from their corresponding data signal lines through their corresponding TFTs set in electrical conduction with their corresponding pixel electrodes as a result of scanning signals in order to apply a voltage to a liquid crystal layer sandwiched between each pixel electrode and an opposing electrode, based on their respective image signals. The alignment of the liquid crystal molecules is controlled in accordance with the applied voltage, whereby the rotation of the polarization axis of each of the incident color light is controlled in order to modulate the color light components. The basic structure and the driving method of this type of liquid crystal panel is similar to the structure and the driving method of the conventionally known active matrix type liquid crystal panel.

Pairs of polarizing means (29, 30), (31, 32), and (33, 34) are provided on the front and back sides of the liquid crystal panels 23, 24, and 25, respectively, with the light-incident side polarizing means being adhered closely to or bonded to an outer surface of the light-incident side substrate of its associated liquid crystal panel, and the light-emitting side polarizing means being adhered closely to or bonded to an outer surface of the light-emitting side substrate of its associated liquid crystal panel. The light-incident side polarizing means 29, 31, and 33 are each a reflecting polarizer which transmits one of two types of polarization axis component light beams (such as p-polarized light beams oscillating parallel to the plane of the figure) of the randomly polarized light from the light source 10, and reflects the other of the two types of polarization axis component light beams substantially perpendicular to the aforementioned polarization axis component light beams (such as s-polarized light beams oscillating perpendicular to the plane of the figure), with the liquid crystal panels 23, 24, and 25 controlling the rotations of the polarization axes of the light beams which have been transmitted through their respective polarizing means in accordance with corresponding image signals. For example, when a p-polarized light beam is transmitted through a light-incident side polarizing means, the associated liquid crystal panel composed of a TN-type liquid crystal controls the rotation of the polarization axis of the p-polarized light beam such that it is rotated through an angle of about 0° to 90°.

In conventional projection-type display apparatuses, the light-incident side polarizing means are absorptive-type polarizers which primarily transmit one of two types of polarization axis component and primarily absorb the other of the two types of polarization axis component, so that beat is produced. In the projection-type display apparatus of the present invention, however, the polarizers, which are films like the polarizers in conventional projection-type display apparatuses, are reflective polarizing means which reflect the other of the polarization axis component light beams, so that only a very small amount of light is absorbed thereby, reducing the amount of generated heat. The reflective polarizing means are composed of multi-layered films, as will be described later.

The light-emitting side polarizing means 30, 32, and 34 control the light in such a manner as to primarily transmit the other of the two types of polarization axis component light beams (such as s-polarized light beams) and to primarily absorb the one of two types of polarization axis component light beams (such as p-polarized light beams). As a result, the light beams, which have been transmitted through the light-emitting side polarizing means 30, 32, and 34, are modulated, with the light intensity being set for each pixel based on the image signals, and enter the prism 26.

It is to be noted that the polarization axis and the reflection axis for each of the light-incident side polarizing means may be set so as to allow transmission of s-polarized light beams and reflection of p-polarized light beams. Obviously, the polarization axis and the absorption axis for each of the light-emitting side polarizing means may be set so as to allow transmission of p-polarized light beams and absorption of s-polarized light beams. The liquid crystals used in the liquid crystal panels do not have to be TN-type liquid crystals with a twisted molecular structure, so that in other embodiments liquid crystals with a planar alignment or with a homeotropic alignment may be used.

The cross dichroic prism 26 operates as a color synthesizing means which synthesizes the three color lights in order to form a color image. The cross dichroic prism 26 consists of four right-angled prisms whose apices are brought into alignment and bonded together with an adhesive, with a dielectric multi-layered film which reflects red light and a dielectric multi-layered film which reflects blue light formed along the inside surfaces to be bonded together so as to form an x-shape. The three color light beams are synthesized along one optical axis by the dielectric multi-layered films in order to produce a light beam carrying a color image. The projection lens 27 operates as a projection optical system which enlarges and projects the color image formed as a result of synthesizing the color light beams onto a screen 28.

The above-described projection-type display apparatus employs, as light modulating means, liquid crystal light valves of the type that modulates a light beam oscillating in a particular polarization direction (such as an s-polarized light beam or a p-polarized light beam). Therefore, when randomly polarized light beams irradiate the liquid crystal panels, about half of the irradiating light beams is absorbed by the light-incident side polarizing means of their respective liquid crystal panels and converted to heat. As a result, the efficiency with which the light is used is reduced, and heat is generated at the light-incident side polarizing means.

In the projection-type display apparatus of the present invention, as mentioned above, the light-incident side polarizing means 29, 31, and 33 are reflecting polarizers which primarily transmit one of two types of polarization axis component light beams, and which primarily reflect the other of the two types of polarization axis component light beams, so that problems such as inefficient use of light due to absorption of light by a light-incident side polarizer and production of heat at the polarizer are greatly mitigated. In addition, the light-incident side polarizing means are, as described below, each multi-layered films, formed by drawing, so that conventional light-incident side polarizers only need to be replaced by the light-incident side polarizing means of the present invention, as a result of which the optical system does not become large. Further, the amount of heat produced is greatly reduced, thereby either eliminating the need for using a cooling means, or simplifying the cooling mechanism, since it is no longer necessary to devise the cooling means in such a way as to increase its cooling efficiency. Still further, although the polarizers were spaced from the liquid crystal panel and held since, a large amount of heat was conventionally produced, the multi-layered film forming a polarizing means can be adhered closely to or bonded to the outer surface of a light-incident side substrate of its associated liquid crystal panel since only a small amount of heat is produced at the polarizing means in the present invention, making it unnecessary to use a holding member for holding the polarizing means.

According to the construction of the present invention, light, reflected by each of the light-incident side polarizing means 29, 31, and 33, reaches a reflector 12 of the light source 10 through, for example, a mirror where it is reflected once again. The linearly polarized light beams of the other type (such as s-polarized light beams), reflected by the light-incident side polarizing means 29, 31, and 33, are converted into circular or elliptic polarized light beams as a result of being, for example, scattered as they enter and are reflected by the reflector 10 and returning back to the light-incident side polarizing means 29, 31, and 33. Thus, when the light beams enter the light-incident side polarizing means 29, 31, and 33 once again, at least some of the linearly polarized light axis component light beams of the other type (such as s-polarized light beams) are converted into the one type of linearly polarized light axis component light beams (such as p-polarized light beams). The converted polarization axis component light beams are capable of transmitting through the aforementioned light-incident side polarizing means 29, 31, and 33.

The polarization axis component light beams, which could not transmit through the light-incident side polarizing means, are reflected again and enter each of the light-incident side polarizing means through the reflector, so that reflection of light is repeated between each of the light-incident side polarizing means and the reflector. Polarization axis component light beams of polarizing means can be obtained in the process of repeated light reflection.

Accordingly, in the present invention, more light can be allowed to transmit through the light-incident side polarizing means of the corresponding liquid crystal light valves than through the light-incident side polarizing means of conventional liquid crystal light valves, so that light from the light source used in the present invention can be used more efficiently than light from a conventional light source.

In the present embodiment, absorptive-type polarizers are used for the light-emitting side polarizing means 30, 32, and 34 as they are used for conventional light-emitting side polarizing means. However, reflective polarizing means, which primarily transmit one of two types of polarization axis component light beams and primarily reflects the other of the two types of polarization axis component light beams substantially perpendicular thereto, may also be used as is the case for the light-emitting side polarizing means. In that case, light beams, reflected by the light-emitting side polarizing means, travel back towards the light source 10 through their respective liquid crystal panels and are reflected at the light source 10 for use at the respective liquid crystal light valves. Since the polarization axis component light beams, which were absorbed conventionally, are reflected, the problem of heat production at the light-emitting side polarizing means is overcome.

Disposing such reflective polarizing means such that light impinges vertically upon the light-incident surface of each of the multi-layered films allows the other type of polarization axis component light beams from each of the films to be reflected towards the light source 10 along the light-incoming optical axis of the incident light. This allows the light beams, reflected at the light source 10, to be guided again towards the polarizing means along the same optical axis. Therefore, the light, reflected by the films, can be used with greater efficiency.

Interposing a ¼ wavelength plate between the light source 10 and the first dichroic mirror 13, forming the color separating means, further facilitates conversion of the polarization axis of the light beams reflected by the reflective polarizing means. More specifically, the polarization axis component light beams of the other type (such as s-polarized light beams), reflected by the reflective polarizing means, are converted into elliptic polarized light beams by the ¼ wavelength plate, and the converted light beams are reflected by the reflector 12 and transmit through the ¼ wavelength plate, whereby the polarization axis component light beams of the other type are converted into the one type of polarization axis component light beams (such as p-polarized light beams). Therefore, when the light beams are made to enter the light-incident side polarizer 29, 31, and 33 of their respective liquid crystal light valves once again, almost all of the incident light beams transmit therethrough, as a result of which the light is used with even greater efficiency.

According to the present invention, the light beams reflected from the polarizing means are made to travel back towards the light valves as a result of being reflected at the light source. In such a case, the light source section must be constructed so as to comprise (1) a reflector including a parabolic mirror which reflects light beams returning back from the separating means as substantially collimated light beams, or (2) a spherical reflecting mirror which reflects light beams returning back from the separating means, and a condensing means, such as a condenser lens which causes the light beams from the reflecting mirror to be condensed and concentrated as substantially collimated light beams.

The present invention is not limited to the above-described embodiment and forms, so that various modifications can be made without departing from the scope of the present invention, as described below.

For example, when the projection-type display apparatus of the present invention is used for projecting a black-and-white image, only one liquid crystal panel and one pair of polarizing means of the projection-type display apparatus of FIG. 1 are required, so that the color separating means for separating three color components from light, and the color synthesizing means for synthesizing three color components can be eliminated. On the other hand, when a color filter which transmits three primary color lights is provided at the inside surface of one liquid crystal panel in order to display a color using a single liquid crystal panel, a color image can be displayed using only one liquid crystal panel and one pair of polarizing means.

In the present embodiment, although each of the light-incident side polarizing means and each of the light-emitting side polarizing means were bonded to the outer surface of their respective substrates of their respective liquid crystal panels, both or either one of the light-incident side polarizing means and the light-emitting side polarizing means may be spaced from its associated liquid crystal panel. In that case, a holding member for holding each of the polarizing means must be additionally provided. In addition, each of the polarizing means must be disposed so that light vertically enters the light-incident surface of each polarizing means, even when each of them is spaced from its associated liquid crystal panel.

Light scattered from the light source can be used more efficiently by disposing an integrator lens between the light source 10 and the first dichroic mirror 13 in order to convert the light from the light source into uniform illuminating light.

The polarization axes of the light beams from the light source 10 may be aligned by disposing between the light source and the first dichroic mirror 13 a polarization converter (refer to FIG. 5 and the description of the converter below) which converts, of the randomly polarized light beams from the light source 10, the reflecting axis light component of each light-incident side polarizing means into a polarization axis light component which leaves therefrom. It is to be noted that since the polarization converter cannot completely convert light from the light source into a polarization axis components, the unconverted part of the light components is reflected by each of the light-incident side polarizing means.

The order in which the color light beams is separated, the method of color separation, and the optical paths followed by the color light beams for combination are not limited to those of the present embodiment, so that, for example, the color light which passes through the light guiding means 22 may be the red color light. In addition, either a dichroic mirror or a dichroic prism may be used for the color separating means and the color synthesizing means.

Even in the above-described modifications, effects such as those described above can be obtained by forming the polarizing means using multi-layered films which primarily transmit one of two types of polarization axis components and primarily reflect the other of the two types of polarization components.

(Description of the Polarizing means)

Figure 6:
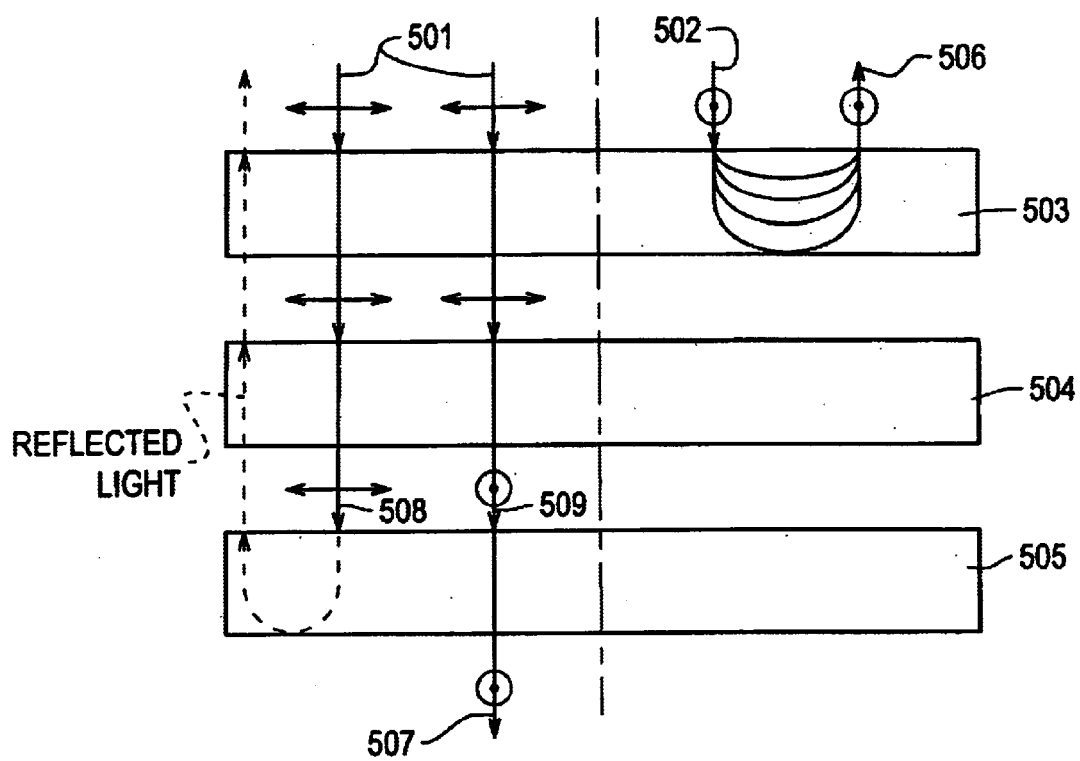
FIG. 6 is an illustration of the operation of the liquid crystal light valve in accordance with the present invention.
Figure 7:
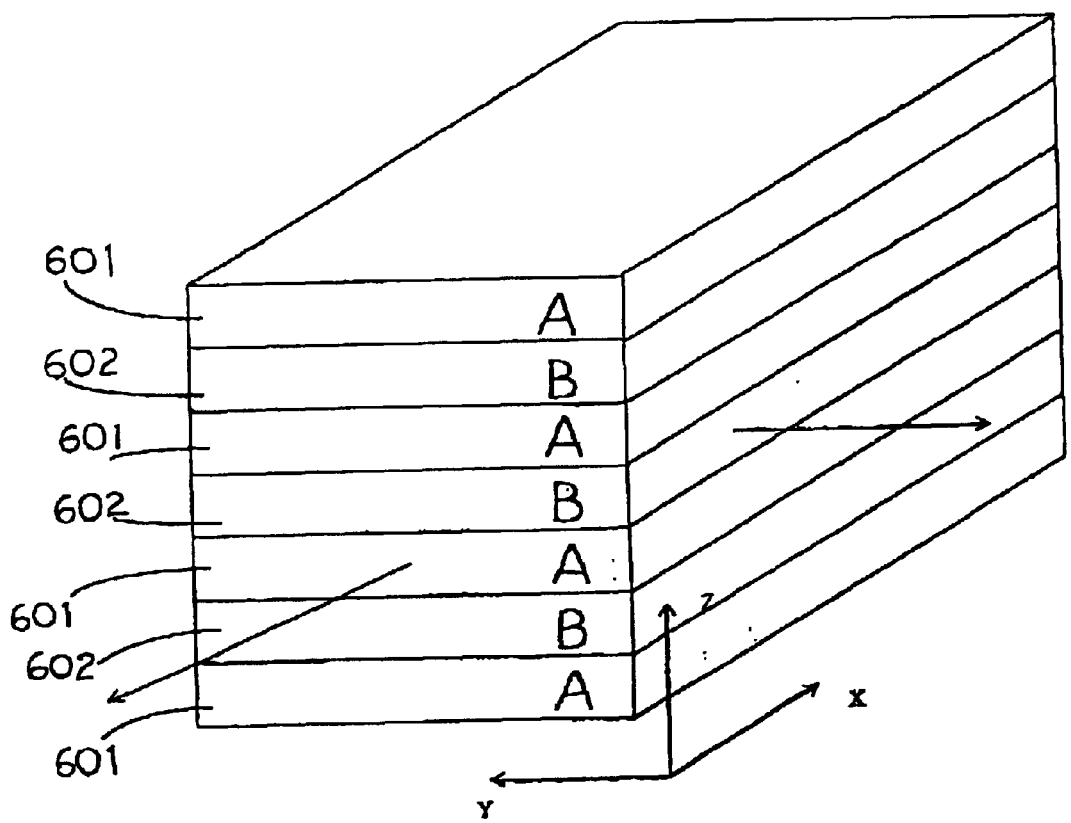
FIG. 7 is a detailed view of a polarizing means employed in the present invention.

A description will now be given in more detail of the structures of the polarizing means 29, 31, and 33 (and the polarizing means 30, 32, and 34) of the present invention, with reference to FIGS. 6 and 7. Each polarizing means of the present invention is a multi-layered film, formed by drawing, which primarily transmits one of two types of polarization axis components and primarily reflects the other of the polarization axis components. FIG. 6 illustrates the transmission and reflection of a polarization axis component in a liquid crystal light valve, when a multi-layered film is used for the light-incident side polarizing means, and the film is used with a liquid crystal panel. FIG. 7 is a structural view of the multi-layered film used as the light-incident side polarizing means of FIG. 6.

In FIG. 6, light beams 501 and 502 are included in the light from the light source. The incident light includes an s-polarization axis component light beam and a p-polarization axis component light beam, which are substantially perpendicular to each other. However, when a polarization converter is inserted at the light source side, and, for example, an s-polarization axis component light beam from the light source is converted into a p-polarization axis component light beam, almost all of the light impinging upon the light-incident side polarizer are p-polarization axis components, so that there is only a very small amount of s-polarization axis components in the light from the light source.

Reference numeral 503 denotes a multi-layered film used as the light-incident side polarizing means, which is a reflecting polarizer which primarily transmits, for example, a p-polarization axis component light beam of the incident light and primarily reflects an s-polarization axis component light beam of the incident light. The p-polarized light beam 501, which has transmitted through the multi-layered film, enters a liquid crystal panel 504. The liquid crystal panel 504 is a TN liquid crystal panel, in which the light beam (a p-polarized light beam) which has impinged upon a pixel to which a voltage has not been applied leaves the liquid crystal panel 504 as an s-polarized light beam 509 after the polarization axis of the p-polarized light beam has been rotated through an angle of about 90°. On the other hand, the light beam (p-polarized light beam) which has impinged upon a pixel to which a saturation voltage has been applied leaves the liquid crystal panel 504 as a polarization axis component light beam 508 unchanged. Reference numeral 505 denotes a light-emitting side polarizing means, being a conventionally used absorptive-type polarizer. When the liquid crystal light valve is used in a normally white mode, the polarization axis of the polarizer 505 is set to an s-polarization axis in order to cause the light beam 509, which has left the liquid crystal panel 504 as an s-polarized light beam, to pass therethrough without its polarization being changed. The light beam 508, which has left the liquid crystal panel 504 as an s-polarized light beam, is absorbed by the polarizing means 505. By controlling the amount of rotation of the polarization axis of the incident light for every pixel in the liquid crystal panel 504, the amount of light transmitting through the polarizing means 505 is controlled for every pixel in order to form an image.

The s-polarization axis incident light beam 502 is shown at the right side of FIG. 6. The s-polarized light beam 502 is reflected back by the multi-layered film 503 towards the light source.

As mentioned above, the light-emitting side polarizing means 505 may be a multi-layered film which primarily transmits one of the two types of polarization axis components and primarily reflects the other of the two types of polarization axis components. In that case, the p-polarized light beam 508 is reflected back towards the light source, instead of being absorbed by the polarizing means as shown in FIG. 6. The polarization axis of the reflected light beam remains as a p-polarization axis.

Such a multi-layered film used in the present invention is called a reflecting polarizer, and is disclosed in detail as a reflective polarizer in Japanese Unexamined Patent Publication No. 9-506985.

FIG. 7 is a view showing in further detail a reflecting polarizer composed of a multi-layered film. The multi-layered film consists of layers of films of drawn polymer placed upon each other, with two types of layers, a layer 601 (A layer) and a layer 602 (B layer) alternately placed on top of each other in a z-axis direction. Each A layer 601 may be made, for example, of drawn PEN, that is polytheylene napthalate, while each B layer 602 may be made of coPEN, that is copolyester of napthalene dicarboxylic acid and terephthallic or isothalic acid. It is obvious that the materials used for forming each reflecting polarizer in the present invention is not limited to the aforementioned materials, so that appropriate materials may be selectively used.

The refractive index ($n_{AX}$) in the x-axis direction and the refractive index ($n_{AY}$) in the y-axis direction of each A layer 601 are not the same. In contrast to this, the refractive index ($n_{BX}$) in the x-axis direction and the refractive index ($n_{BY}$) in the y-axis direction of each B layer 602 are substantially equal. The refractive index ($n_{AY}$) in the y-axis direction of each A layer 601 and the refractive index ($n_{BY}$) in the y-axis direction of each B layer 602 are substantially equal. In sum, $(n_{AX}) \neq (n_{AY})$, $(n_{BX}) \cong (n_{BY}) \cong (n_{AY})$ Accordingly, of the light incident upon the multi-layered film, the linearly polarized light beam in the y-axis direction (p-polarized light beam in the present embodiment) transmits through the multi-layered film unchanged, since there are essentially no differences between the refractive indices between the layers.

When the thickness of each A layer 601 in the z-axis direction is $t_A$, and the thickness of each B layer 602 in the z-axis direction is $t_B$, wavelength of the incident light beam is $\lambda$ and when $t_A \cdot n_{AX} + t_B \cdot n_{BX} \cong \lambda/2$ . . . [Formula (1)], the linearly polarized light beam in the x-axis direction (s-polarized light beam in the present embodiment) of the light from wavelength x is reflected as a polarized light beam in the x-axis direction at the interface between each adjoining A and B layers. When the A layers 601 and the B layers 602 are formed with thicknesses $t_A$ and $t_B$ of various values, and Formula (1) is satisfied for a wide range of visible light wavelengths, thereby widening the transmission wavelength band, the white color component of the linearly polarized light beam (s-polarized light beam) in the x-axis direction can be reflected. It is to be noted that the multi-layered film may be formed by successively placing layers of different thicknesses upon each other, or by placing a plurality of sets of layers with identical thicknesses. Although the symbol $\cong$ is used, it is preferable that the refractive indices be exactly equal to each other.

When the polarization precision of the reflecting polarizer formed of a multi-layered film is low, high precision may be achieved by forming a reflecting polarizer structure consisting of a plurality of reflecting polarizers disposed along the optical axis.

Figure 8:
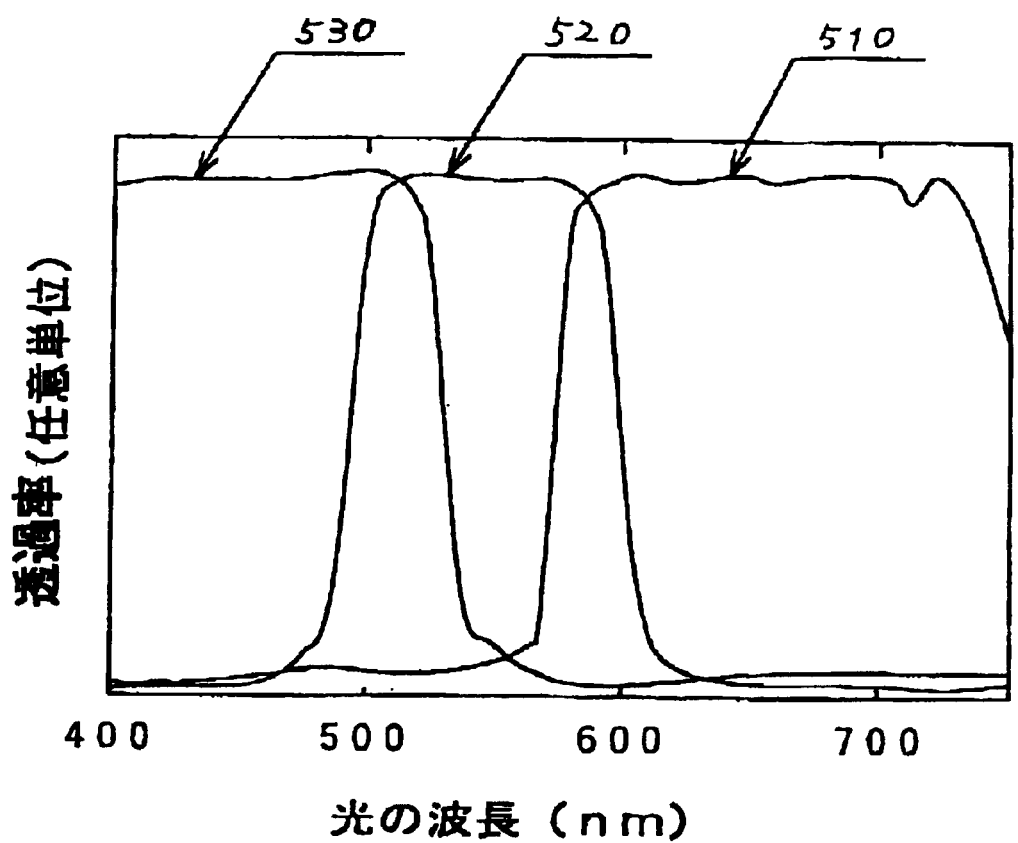
FIG. 8 is a graph showing wavelength selective transmission characteristics of each liquid crystal light valve, serving as a polarizing means.
Figure 9:
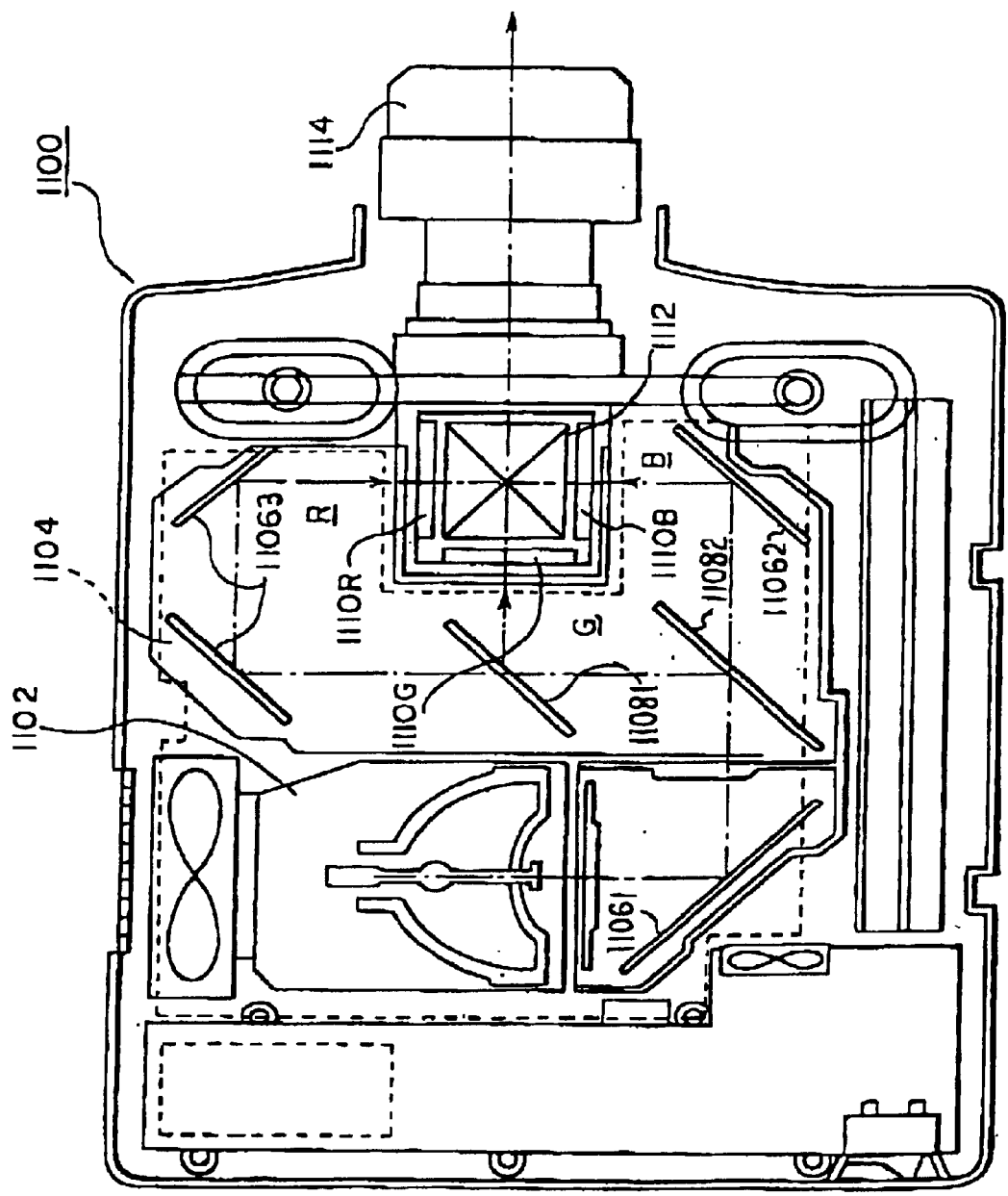
FIG. 9 is a view showing the structure of a conventional projection-type display apparatus.
Figure 10:
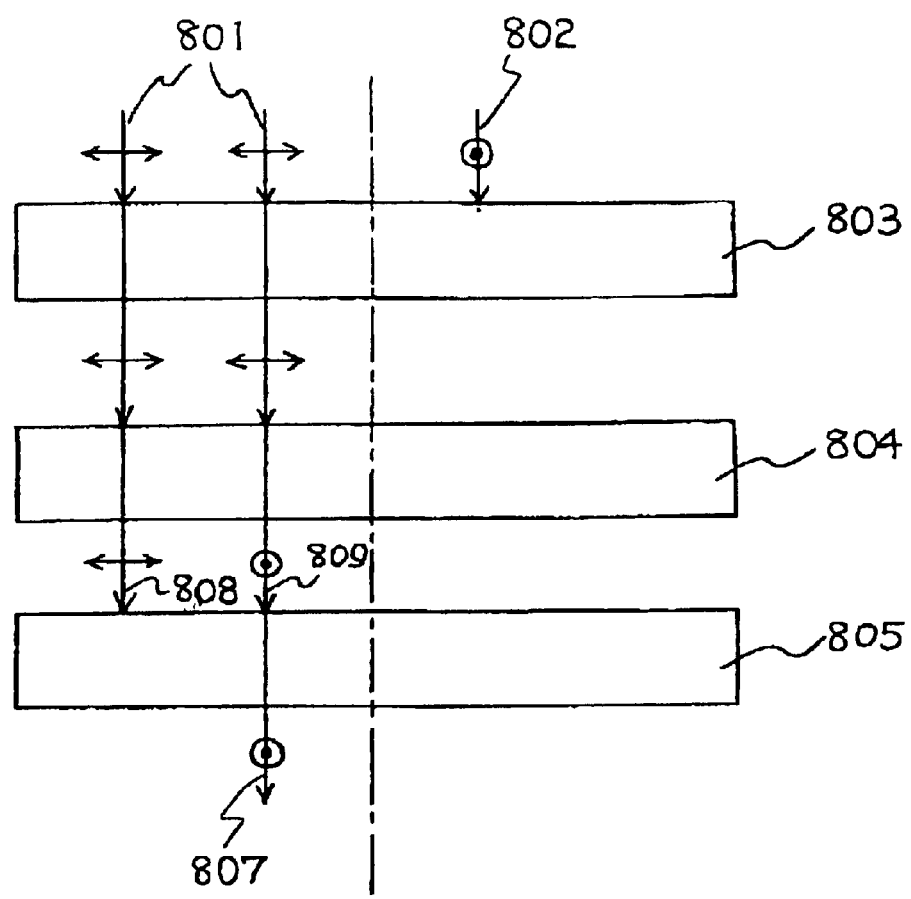
FIG. 10 is an illustration of the operation of a conventional liquid crystal light valve.

The wavelength selective transmission characteristics of the polarizing means do not have to be the same for all of the three liquid crystal light valves, so that they can be such as to allow selective transmission of the color light to be modulated by their respective light valves. More specifically, as shown in FIG. 8, the wavelength selective transmission characteristic 510 of the polarizing means 29 and 30 of the red color light valve is such as to allow selective transmission of the red color wavelength band (approximately 600 nm to 700 nm); the wavelength selective transmission characteristic 520 of the polarizing means 31 and 32 for the green color light valve is such as to allow selective transmission of the green color wavelength band (approximately 500 to 600 nm); and the wavelength selective transmission characteristic 530 of the polarizing means 33 and 34 of the blue color light valve is such as to allow selective transmission of the blue color wavelength band (approximately 400 to 500 nm). Here, each polarizing means functions as an interference color filter, reflecting, not transmitting wavelength light falling outside of the wavelength band. Therefore, even if the dichroic mirror does not sufficiently separate color components of the light, the color light beams which enter their respective light valves are of high purity, so that the color of the synthesized color light beams modulated by their respective light valves are of high purity, making it possible to provide a projection-type display apparatus with high color reproducibility. More specifically, this can be achieved by placing a second multi-layered film consisting of layers with thicknesses and refractive indices which are different from those of the A layers 601 and the B layers 602 of FIG. 7. The second multi-layered film is formed such that the transmission wavelength band of the linearly polarized light beam in the y-axis direction (p-polarized light beam in the present embodiment) falls within part of the visible light wavelength band.

In other words, the refractive indices are set such that $(n_{AX}) \neq (n_{AY})$, $(n_{BY}) \cong (n_{BX}) \cong (n_{AX})$, and the thicknesses are set such that $t_A \cdot n_{AY} + t_B \cdot n_{By} \cong \lambda/2$ . . . [Formula (2)]. Here, the wavelength $\lambda$ is set as a wavelength band which does not transmit through the reflective polarizing means. For example, in order for the polarizing means 29 and 30 of the red color light valve to have the wavelength selective transmission characteristic 510, wavelength bands other than the red color wavelength band are set as $\lambda$. Similarly, in order for the polarizing means 31 and 32 of the green color light valve and the polarizing means 33 and 34 of the blue color light valve to have the wavelength selective transmission characteristics 520 and 530, respectively, wavelength bands other than the green color wavelength band and wavelength bands other than the blue color wavelength band are defined as $\lambda$, respectively. In this case, when the second multi-layered films of each of the light valves are formed with different thicknesses in accordance with the wavelength bands they reflect, each of the light valves transmits p-polarized light beams with a color wavelength to be modulated by their respective second multi-layered films. It is to be noted that almost all of the s-polarized light beams are reflected by each of the first multi-layered films described above. The second multi-layered films may be placed either at the light-incident side or light-emitting side of their respective first multi-layered films.

Since the color lights which enter the liquid crystal panels can be made very pure by making the wavelength selective transmission bands of their corresponding polarizing means narrower than the wavelength separating bands of the light transmitted through or reflected by the dichroic mirror, a projection-type display apparatus with high color reproducibility can be obtained.

The wavelength selective transmission band of each polarizing means may be the same as or wider than the wavelength separating band of the light transmitted through or reflected by each dichroic mirror. The dichroic mirrors cannot completely separate wavelengths, so that the three color lights separated from the light also consist of wavelength components which are different from those which they should have. However, when the polarizing means of the present invention have wavelength selective transmission characteristics which are the same as or broader than the wavelength separation characteristics of the dichroic mirrors, the wavelength band separated from the light by the dichroic mirrors transmits through the polarizing means, so that only the wavelength band components other than the wavelength band components separated by the dichroic mirrors are reflected by the polarizing means. This makes it possible to produce a projection-type display apparatus which maintains its color reproducibility to a certain extend and allows light to be used with greater efficiency.

It is not necessary for both of the reflective polarizing polarizers of each of the liquid crystal light valves to have exactly the same wavelength selective transmission characteristic, so that the wavelength selective transmission characteristic of the light-incident side polarizing means of the light source side may be different from the wavelength selective transmission characteristic of its associated light-emitting side polarizing means disposed of the opposite side of the light source side. In addition, only one of the two reflective polarizing means may be formed to have a wavelength selective transmission characteristic.

In each of the light-incident side reflective polarizing means, the film thickness is set to reflect at least infrared ray components and ultraviolet ray components. It is preferable not to absorb or transmit these wavelengths, since they deteriorate characteristics and cause heat production.

In the foregoing description, the polarization axis and the reflection axis of each light-incident side polarizing means may be set such that s-polarized light beams are transmitted and p-polarized light beams are reflected. Obviously, the polarization axis and the absorption axis (or reflection axis) of each light-emitting side polarizing means may be set opposite to the aforementioned setting.

The structures of the above-described polarizing means are employed in the projection-type display apparatuses of each of the embodiments described below.

[Embodiment 2]

Figure 2:
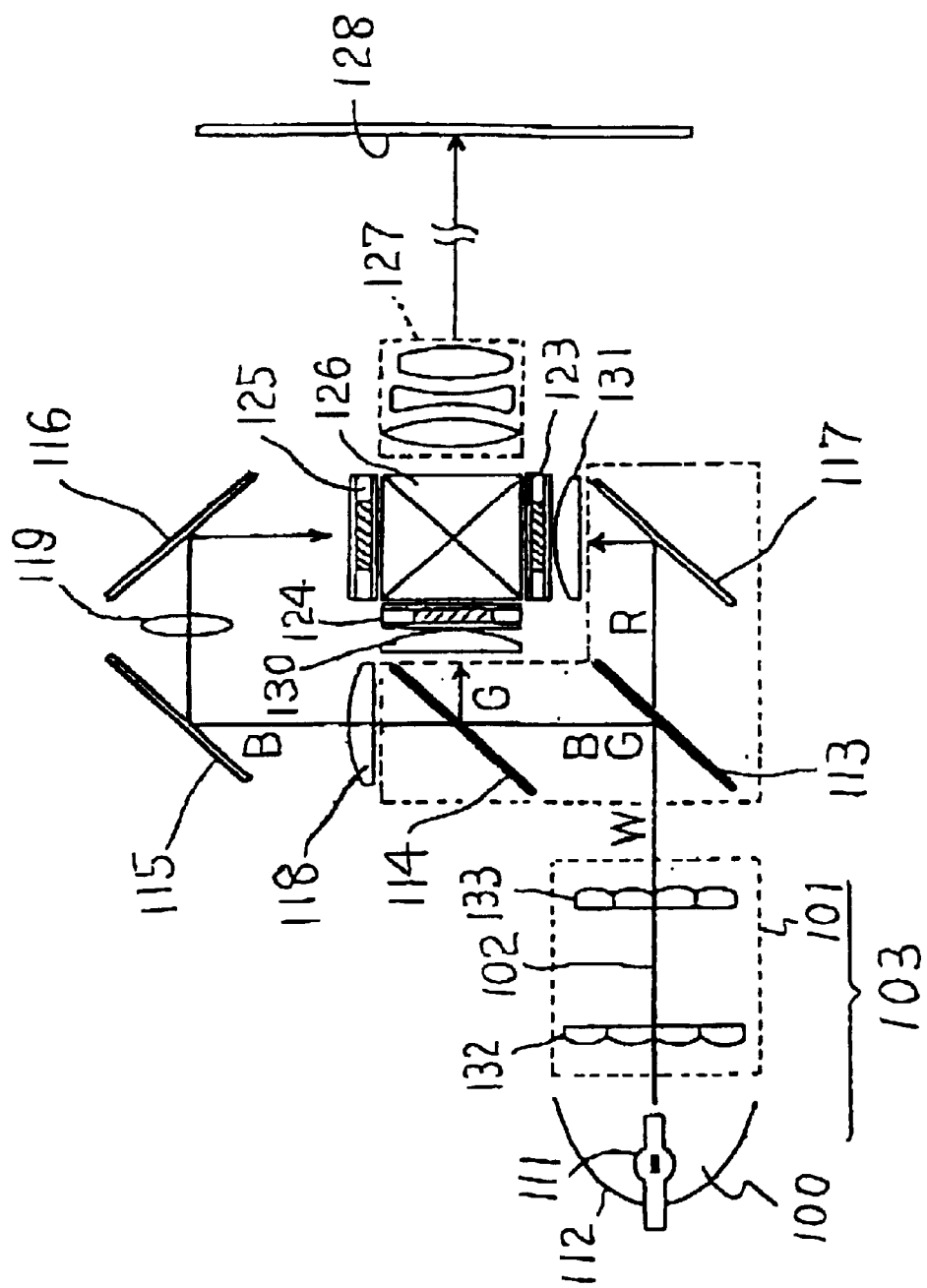
FIG. 2 is a view showing the structure of the projection-type display apparatus of Embodiment 2 in accordance with the present invention.

A description will now be given of the projection-type display apparatus of Embodiment 2, with reference to the drawings. FIG. 2 is a schematic structural view of the main portion of the projection-type display apparatus of the present embodiment. The basic structure of the projection-type display apparatus of the present embodiment is essentially the same as that of Embodiment 1. It differs from that of Embodiment 1 in that it includes an illuminating optical system 103 consisting of a light source 100 and a uniform illuminating optical system 101, and condenser lenses 118, 130, and 131. It is to be noted that component parts of Embodiment 2 which are not particularly described are essentially the same as corresponding component parts of Embodiment 1.

Luminous flux from the illuminating optical system 103 is separated into a red (R) light beam and a blue/green light beam by a first dichroic mirror 113 which transmits red light beams and reflects blue/green light beams. The blue/green light beam, which is reflected by the first dichroic mirror 113, is separated into a green light beam and a blue light beam by a second dichroic mirror 114 which reflects the green (G) light beam and transmits the blue (B) light beam. The two dichroic mirrors each forms a color separating means, and the three separated color lights enter their respective liquid crystal light valves 123, 124, and 125.

The red color light beam, which has passed through the first dichroic mirror 113, is reflected by a mirror 117 and enters the condenser lens 131, being a plano-convex lens which collimates the red color light beam which enters the liquid crystal valve 123. The green color light beam, which has been reflected by the second dichroic mirror 114, is collimated by the condenser lens 130, similarly being a plano-convex lens, and enters the liquid crystal light valve 124. The blue light beam, which has passed through the second dichroic mirror 114, is collimated by the condenser lens 118, being a plano-convex lens, and reflected by a mirror 115, after which the reflected light beam is collimated again through a relay lens 119, is reflected by a mirror 116, and enters the blue color liquid crystal light valve 125 as a collimated light beam. The relay lens 119 is interposed to prevent loss of blue light as a result of the optical path length from the light source to the blue light liquid crystal light valve being longer than the optical path lengths from the light source to the red light liquid crystal light valve and from the light source to the green light liquid crystal light valve. The focal length of the relay lens 119 is substantially equal to the optical path length from the light-outgoing point of the condenser lens 118 to the liquid crystal light valve 125. Thus, the distances from the light source to each of the light valves are essentially equal.

The liquid crystal light valves 123, 124, and 125 each comprises a light-incident side polarizing means, a liquid crystal panel, and a light-emitting side polarizing means, which have the same structure and function as those in Embodiment 1. As in Embodiment 1, the structure of each liquid crystal panel is an active matrix type, transmissive liquid crystal panel including a TFT and a pixel electrode connected thereto, for every pixel. The transmission and reflection of the light beams through and by each of the liquid crystal light valves are the same as those described in Embodiment 1 illustrated in FIG. 6. Each of the light-incident side polarizing means is a multi-layered film, described in the Embodiment 1 section (see FIG. 7), which primarily transmits one of two types of polarization axis component light beams (such as p-polarized light beams) and primarily reflects the other of the two types of polarization axis component light beams (such as s-polarized light beams). As in Embodiment 1, each light-emitting side polarizing means may be an absorptive-type polarizer, as has been conventionally the case, or may be a reflecting polarizer, similarly to each of the light-incident side polarizer. In each of the liquid crystal light valves, the multi-layered films of FIG. 7 forming each of the light-incident side polarizing means and each of the light-emitting side polarizing means are adhered closely to or bonded to the outside surfaces of the pair of substrates of the respective liquid crystal panels.

The color light beams, modulated by their respective liquid crystal light valves 123, 124, and 125, are synthesized on the same optical axis by a cross dichroic prism 126, similar to that in Embodiment 1, and the resulting color light beam is guided to a projection lens 127. The color synthesized light beam, projected by a projection lens 127, forms an image on a screen 128 for image display.

The polarization axis and the reflection axis of each light-incident side polarizing means may be set so as to transmit an s-polarization axis and reflect a p-polarization axis, respectively. The polarization axis and the absorption (reflection) axis of each light-emitting side polarizing means may be set opposite to the aforementioned setting. Each reflecting polarizer used in the present invention may have a wavelength selective transmission characteristic, such as that described in the Embodiment 1 section. In that case, the structure and the operation of the polarizing means are essentially the same as those described in Embodiment 1.

As can be understood from the foregoing description, at least the light-incident side polarizing means of each liquid crystal light valve transmits one of two types of polarization axis component light beams and reflects the other of the two types of polarization axis components, so that the amount of heat produced at each of the light-incident side polarizer is greatly reduced. Forming each of the light-emitting side polarizing means using a reflecting polarizer, as is the case when each of the light-incident side polarizing means is formed, greatly reduces the amount of heat produced at each of the light-emitting side polarizing means, as has been described in Embodiment 1, and allows light to be used with even greater efficiency. Since each of the polarizing means is a multi-layered film like the one illustrated in FIG. 7, a conventional polarizer only needs to be replaced by such a polarizing means, so that the size of the optical system does not become large. In addition, since there is a sharp decrease in the amount of heat produced, a cooling means can be eliminated or the cooling mechanism can be simplified since it is no longer necessary to devise the cooling means in such a way as to increase its cooling efficiency. In addition, such a reflecting polarizer can be adhered closely to or bonded to the outer surface of each of the substrates of the liquid crystal panels.

The uniform illuminating optical system 101 comprises a first lens plate 132 and a second lens plate 133, which are disposed parallel to each other on a plane perpendicular to a center axis 102 of the illuminating optical system. The first lens plate 132 and the second lens plate 133 each consists of a plurality of rectangular lenses disposed in a matrix arrangement. The rectangular shape of each of the lenses of the first lens plate 132 is similar to the shape of each liquid crystal panel, so that the image from each rectangular lens of the first lens plate 132 is superimposed upon and irradiates each of the liquid crystal panels through each rectangular lens of the second lens plate 133. The luminous flux from the light source 100 is to begin with such that light beams near the center have a higher intensity and those near the periphery have a low intensity. The each rectangular lense in a matrix arrangement of the first lens plate condenses and concentrates light beams emitted from each of the portions of the luminous flux, from those near the center to those at the periphery, and the rectangular lenses of the second lens plate cause the light beams to be superimposed and illuminate each of the liquid crystal panels, thereby producing a bright and uniform image within the screen.

Accordingly, in the present embodiment, multi-layered films, illustrated in FIG. 7, are disposed as the polarizing means of each of the liquid crystal light valves 123, 124, and 125, and light of uniform brightness irradiates every location of the light-incident surface of each film through the uniform illuminating optical system 103 so that one of two types of polarization axis component light beams is transmitted and the other of the two types of polarization axis component light beams is reflected. This means that the one type of polarization axis component luminous flux of uniform intensity distribution within a plane enters each of the liquid crystal panels. The condenser lenses 118, 130, and 131, which collimate the light beams from the light source, cause the light beams to enter their respective light-incident side polarizing means (or light-emitting side polarizing means) substantially perpendicular to the light-incident surfaces of the polarizing means, so that even if the polarization axis component light beams of the other type are reflected by the polarizing means, they are reflected back towards the uniform illuminating optical system 103 along the optical axis. The light source includes a reflector 112 which causes any light beams emitted from a light source lamp 111 or reflected from any of the polarizing means to travel towards the first lens plate as substantially parallel beams. Therefore, as mentioned in the Embodiment 1 section, the reflected light beams are reflected again by the reflector 112 of the light source, and impinge once again on the light-incident side polarizing means of their respective liquid crystal light valves 123, 124, and 125. Here, at least some of the polarization axis component light beams of the other type are converted into the polarization axis component of the light-incident side polarizing means as they are reflected by the reflector 112 and travel back towards the polarizing means, so that the converted light beams can be used for projection.

According to the present invention, the light beams reflected from the polarizing means are reflected by the light source back towards the light valves. In such a case, the light source section must be constructed so as to comprise (1) a reflector of the light source including a parabolic reflecting mirror which reflects light beams returning back from the separating means and impinge as substantially collimated light beams, or (2) a reflecting mirror, such as a spherical reflector, which reflects light beams returning back from the separating means, and condensing means, such as a condenser lens which causes the light beams from the reflecting mirror to be condensed and concentrated as substantially collimated light beams.

The present invention is not limited to the above-described embodiment and forms, so that various modifications can be made without departing from the scope of the present invention, as described below.

For example, when the projection-type display apparatus of the present invention is used for projecting a black-and-white image, only one liquid crystal panel and one pair of polarizing means are required, so that the color separating means for separating luminous flux into three color light components from the light, and the color synthesizing means for synthesizing three color light components can be eliminated. On the other hand, when a color filter which transmits three primary color lights is provided at the inside surface of one liquid crystal panel in order to display a color image using a single liquid crystal panel, a color image can be displayed using only one liquid crystal panel and one pair of polarizing means.

In the present embodiment, although each of the light-incident side polarizing means and each of the light-emitting side polarizing means were bonded to the outer surface of their respective substrates of their respective liquid crystal panels, both or either one of the light-incident side polarizing means and the light-emitting side polarizing means may be spaced from its associated liquid crystal panel. In that case, a holding member for holding each of the polarizing means must be additionally provided. In addition, each of the polarizing means must be disposed so that light vertically enters the light-incident surface of each polarizing means, even when one or both of them are spaced from its associated liquid crystal panel.

The polarization axes of the light beams from the light source may be aligned by disposing between the light source 100 and the first dichroic mirror 113 a polarization converter (refer to FIG. 5 and the description of the converter below) which converts, of the randomly polarized light beams from the light source, the reflecting axis light component of each light-incident side polarizing means into a polarization axis component. It is to be noted that since the polarization converter cannot completely convert the light beams from the light source into polarization axis components, the unconverted light beam components are reflected by each of the light-incident side polarizing means.

The order in which the color light beams is separated, the method of color separation, and the optical paths followed by the color light beams for combination are not limited to those of the present embodiment, so that, for example, the color light which passes through the light guiding means may be the red light.

[Embodiment 3]

Figure 3:
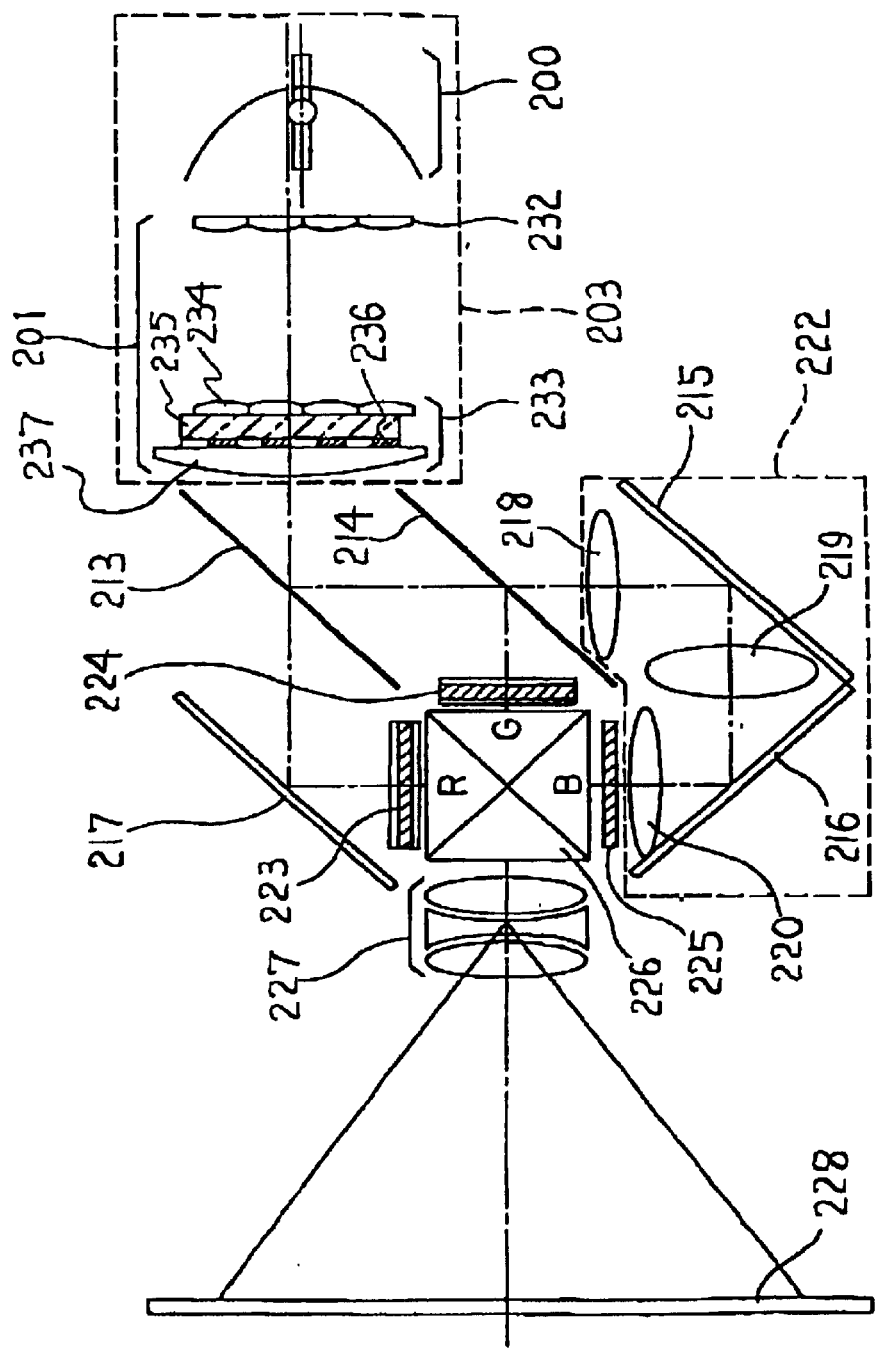
FIG. 3 is a view showing the structure of the projection-type display apparatus of Embodiment 3 in accordance with the present invention.

A description will now be given of Embodiment 3, with reference to the drawings. FIG. 3 is a schematic structural view of the main portion of the projection-type display apparatus of the present embodiment. The basic structure of the projection-type display apparatus of the present embodiment is essentially the same as that of Embodiment 1. It differs from that of Embodiment 1 in that it includes an illuminating optical system 203 comprising a light source 200 and a polarizing illuminating optical system 201. It is to be noted that component parts of the present embodiment which are not particularly described are essentially the same as corresponding component parts of Embodiment 1.

The projection-type display apparatus comprises the light source 200, dichroic mirrors 213 and 214, reflecting mirrors 215, 216, and 217, a light-incoming lens 218, a relay lens 219, a light-outgoing lens 220, three liquid crystal light valves 223, 224, and 225, a cross dichroic prism 226, and a projection lens 227. It is to be noted that the light-incoming lens 218, the relay lens 219, the light-outgoing lens 220, and the reflecting mirrors 215 and 216 form a light-guiding means 222.

In FIG. 3, the light source 200 has essentially the same structure as that of Embodiment 1. As in Embodiment 1, the dichroic mirror 213 and 214 operate as color separating means which separate the luminous flux from the light source into three color light beams, a red light beam, a blue light beam, and a green light beam. The luminous flux from the light source 200 is separated into a red (R) light beam and a green/blue light beam by the first dichroic mirror 213 which transmits red light and reflects green/blue light. The green/blue light beam, reflected by the first dichroic mirror 213, is separated into a green light beam and a blue light beam by the second dichroic mirror 214 which reflects green light (G) and transmits blue (B) light. The color separating means is composed of the two dichroic mirrors, and the separated three color light beams enter their respective liquid crystal light valves 223, 224, and 225.

In the present embodiment, in the three color lights, the optical path length of blue light is the longest. Thus, for the blue light beam, the light-guiding means 222 consisting of a relay lens system including the light-incoming lens 218, the relay lens 219, and the light-outgoing lens 220, is provided behind the dichroic mirror 214. The blue light beam, which has transmitted through the green light reflecting dichroic mirror 214, is guided to the relay lens 219 through the light-incoming lens 218 and the reflecting mirror 215. Then, the blue light beam is reflected by the reflecting mirror 216 and guided to the light-outgoing lens 220, after which it enters the blue color liquid crystal light valve 225.

The liquid crystal light valves 223, 224, and 225 each comprise a light-incident side polarizing means, a liquid crystal panel, and a light-emitting side polarizing means, which have the same structure and function as those in Embodiment 1. As in Embodiment 1, the structure of each liquid crystal panel is an active matrix, the transmissive liquid crystal panel including a TFT and a pixel electrode connected thereto, for every pixel. The operation of the transmission and reflection of the light beams through and by each of the liquid crystal light valves are the same as those described in Embodiment 1 illustrated in FIG. 6. Each of the light-incident side polarizing means is a multi-layered film, like the one described in the Embodiment 1 section (see FIG. 7), which transmits one of two types of polarization axis component light beams (such as a p-polarized light beams) and reflects the other of the two types of polarization axis component light beams (such as a s-polarized light beams). As in Embodiment 1, each light-emitting side polarizing means may be an absorptive-type polarizer, as has been conventionally the case, or may be a reflecting polarizer, like each of the light-incident side polarizer. In each of the liquid crystal light valves, the multi-layered films of FIG. 7 forming each of the light-incident side polarizing means and each of the light-emitting side polarizing means are adhered closely to or bonded to the outside surfaces of the pair of substrates of the respective liquid crystal panels.

The color light beams, modulated by their respective liquid crystal light valves 223, 224, and 225, are synthesized on the same optical axis by a cross dichroic prism 226, similar to that in Embodiment 1, and the resulting color light beam is guided to a projection lens 227. The color synthesized light beam, projected by the projection lens 227, forms an image onto a screen 228 for image display.

The polarization axis and the reflection axis of each light-incident side polarizing means may be set so as to transmit an s-polarization axis and reflect a p-polarization axis. The polarization axis and the absorption (reflection) axis of each light-emitting side polarizing means may be set opposite to the aforementioned setting. Each reflecting polarizer used in the present invention may have a wavelength selective transmission characteristic, as was described in the Embodiment 1 section. In that case, the structure and the operation of the polarizing means are essentially the same as those described in Embodiment 1.

The present embodiment differs from Embodiments 1 and 2 in that illuminating optical system 203 including polarizing illuminating optical system 201 is employed. The polarizing illuminating optical system 201 converts the randomly polarized light beams from the light source 200 so that they leave it as virtually one type of linearly polarized light beams whose polarization directions are substantially the same.

A description will now be given in more detail of the illuminating optical system 203. The light source 200 includes a lamp and a parabolic reflector, with the light beams from the lamp being reflected by the reflector in one direction and converted into substantially parallel luminous flux which enters the polarizing illuminating optical system 201. The optical axis of the light beams of the light source 200 is shifted a certain distance from and to a location parallel to the light-outgoing optical axis of the illuminating optical system 203. The reflector may be spherical, and a condenser lens which condenses and concentrates the light beams reflected from the reflector as substantially collimated light beams may be provided on the light source side of the first optical element 232 described later.

The polarizing illuminating optical system 201 includes a first optical element 232 and a second optical element 233. The first optical element 232 is composed of a lens plate with a plurality of rectangular lenses disposed in a matrix arrangement. The optical axis of the light source 200 is set so as coincide with the center axis of the first optical element 232. Similar to the first lens plate 132 of FIG. 2, the rectangular lenses of the first optical element 232 have shapes which are similar to that of the liquid crystal panels. The second optical element 233 comprises a condenser lens array 234, a polarization beam splitter array 235, a wavelength plate 236, and a light-emitting side lens 237. Similar to the lens plates of the second lens plate 133 of FIG. 2, the condenser lens array 234 includes a plurality of rectangular lenses. As in Embodiment 2, the rectangular lenses of the second lens plate causes images from each of the rectangular lenses of the first optical element to be superimposed upon and irradiate the liquid crystal panels, so that the liquid crystal panels can be illuminated with uniform brightness using two rectangular lens arrays.

The polarization beam splitter array 235 functions as a polarization converter which converts one of two types of polarization axis light beams (such as a s-polarized light beams) into the other of the two types of polarization axis light beams (in this case p-polarized light beams) which leave therefrom, with one of two types of polarization axes being aligned with the other of the two types of polarization axes.

Figure 5:
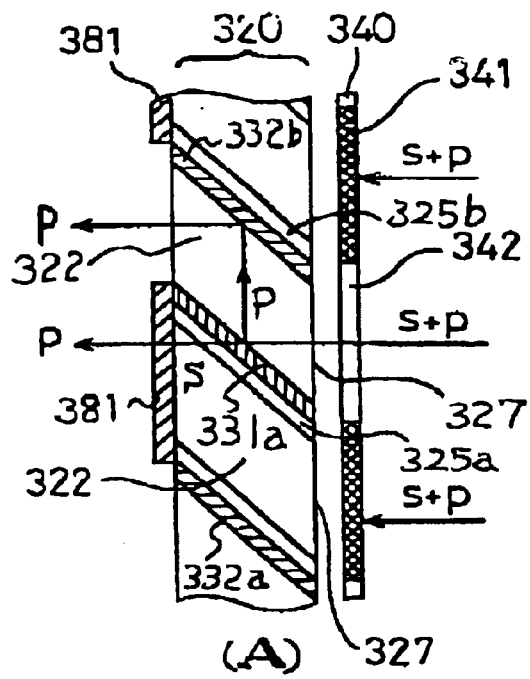
FIGS. 5(A) and 5(B) are views showing the polarization beam splitter array (polarization converter) of FIG. 3.
Figure 5:
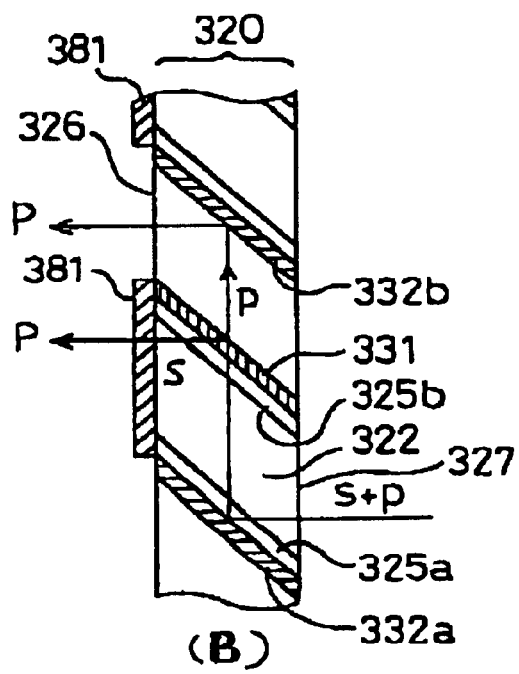

FIG. 5 is a view showing in more detail the polarization beam splitter array 235.

FIG. 5(A) is a view showing a first example of the structure thereof. The polarization beam splitter array 235 includes a plate-shaped polarized light separating means 320 formed by bonding together a plurality of parallelogrammic cross section light-transmitting members 322 (made of glass or the like) at their parallel surfaces, using adhesives 325a and 325b. Since the light source 200 is randomly polarized, the light (including p-polarized light beams and s-polarized light beams), which has been condensed and concentrated by the condenser lens 234 provided on the front portion of the polarization beam splitter array 235, first enters an optical member consisting of a light-transmitting section 342 and a light-shielding section 341. The light, which has passed through the light-transmitting section 342, enters each light-incident surfaces 327 of the corresponding light-transmitting members 322. It is to be noted that the incident light is condensed and concentrated at the light-transmitting section 342 by the condenser lens 234 disposed right in front of the light-transmitting members 322. The light does not enter the light-incident surfaces 327, facing the light-shielding section 341, which block the light. The light-shielding section 341 has some incident light, however the light-shielding section acts as a reflecting mirror, which reflects light incident thereto towards the reflector of the light source 200 where it is reflected again.

Of the s-polarized light beams and the p-polarized light beams, which impinge on, the p-polarized light components are reflected by a polarized light separating film 331a. The film is an interference multi-layered film which is formed on one side of the surfaces of each light transmitting member 322 by evaporation. After formation of the film, each light-transmitting member is bonded together with an adhesive 325. The s-polarized light components, which have transmitted through the polarized light separating film, are converted into p-polarized light beams by rotating the polarization axis of the s-polarized light beams through an angle of about 90 degrees by means of respective polarization converting films (¼ wavelength plates) 381 (corresponding to 236 of FIG. 3). On the other hand, the reflected p-polarized light beams are reflected by a reflecting film 332b. Therefore, light beams whose polarization axes are substantially aligned with the p-polarization axis are reflected from the polarization beam splitter array in the direction of the optical axis of the polarizing illuminating optical system 201.

By virtue of the above-described structure, the polarization beam splitter array converts the randomly polarized light beams from the light source into p-polarized light beams which leave therefrom. Actually, a polarizing converting film 381 can convert almost but not all of the s-polarized light components into p-polarized light beams. Therefore, there are some light beams which remain unconverted, so that light beams other than p-polarized component light beams (such as s-polarized light components) leave the polarizing converting film 381.

FIG. 5(B) shows a second example of the structure thereof. As shown in the figure, the polarization beam splitter array 235 includes a plate-shaped polarized light separating means 320 formed by bonding together a plurality of parallelogrammic cross section light transmitting members (made of glass or the like) at their parallel surfaces with an adhesive 325. In the polarized light separating means 320, since the light source 200 emits randomly polarized light, the light beams (including p-polarized light beams and s-polarized light beams) condensed and concentrated by the condenser lens 234, enter the light-incident surfaces 327 of their respective light-transmitting members 322. The incident s-polarized and p-polarized light components of the light are then reflected by a reflecting film 332. The reflected p-polarized and s-polarized light components of the light are separated by a polarized light separating film 331 into a p-polarized light and a s-polarized light. The polarized light separating film 331 reflects s-polarized light beams and transmits p-polarized light beams. Accordingly, the p-polarized light beams, which have transmitted through the polarized light separating film 331, leaves the reflecting film 332b after being reflected thereby. A wavelength plate 381 (corresponding to 236 of FIG. 3), being a ¼ wavelength plate, is disposed on the light-emitting surface 326 of every other light-transmitting member 327, and converts s-polarized light by rotating through an angle of substantially 90 degrees into p-polarized light which leave each wavelength plate 381. Although in the second structure example the light beams are condensed and concentrated at the light-incident surfaces 327 by the condenser lens 234, a small amount of light enters light-incident surfaces other than the light-incident surfaces 327. Such light beams leave the surfaces as unconverted s-polarized light beams.

As can be understood from the foregoing description of the two examples of the structure of the polarization beam splitter array, the polarization beam splitter array can convert the randomly polarized light beams from the light source into substantially p-polarized light beams in the direction of the optical axis of the polarizing illuminating optical system 201. The luminous flux, which was left, is collimated by the light-emitting side lens 237 which are directed towards the dichroic mirror 213.

Actually, a polarizing converting film 381 can convert almost but not all of the s-polarized light components into p-polarized light. Therefore, there are some s-polarized component light beams, which remain unconverted, leaving the polarizing converting film 381. In addition, when light beams enter any light-incident surface of a light-transmitting member without a polarizing converting film 381, both the p-polarized light and the s-polarized light are reflected by polarized light separating film 331 and the reflecting film 332b, so that they leave therefrom without their polarization axes being aligned.

In the above-described Embodiments 1 and 2, randomly polarized light beams (including both p-polarized light beams and s-polarized light beams) from the light source enter multi-layered films, serving as light-incident side polarizing means of the liquid crystal light valves, which primarily transmit one of two types of polarization axis light beams (such as p-polarized light beams) and primarily reflects the other of the two types of polarization axis light beam (such as s-polarized light beams). Therefore, about half of the incident light is reflected, and the light is reflected repeatedly between the light source and each of the light-incident side polarizing means. Although at least part of the light reflected again at the light source has its polarization axis changed by the light-incident side polarizing means so that it transmits through the polarizing means and reaches the liquid crystal panels, the remaining part of the light, which has been reflected again, is reflected back again by the light-incident side polarizing means to the light source. Repeated reflection, however, causes gradual loss of light, so that the projection-type display apparatus is still not capable of allowing use of most of the light from the light source.

In the present embodiment, however, almost all of the randomly polarized light from the light source can be converted by the polarizing illuminating optical system 201 into light beams with their polarization axes aligned with the polarization axis of the light-incident side polarizing means, so that most of the light from the light source transmits through the light-incident side polarizing means of each liquid crystal light valve, and the remaining polarized light components whose polarization could not be properly changed are reflected back towards the polarization converter by the light-incident side polarizing means. The light beams, which have returned back to the polarization converter, are converted into light with its polarization axis aligned with that of the light-incident side polarizing means, as they are reflected again on the light-incident side polarizing means by the polarization converter and the reflector of the light source, so that some of the light beams transmit through the light-incident side polarizing means to be used for projection. Therefore, in the present embodiment, light can be used more efficiently than in Embodiments 1 and 2.

In the polarization beam splitter array of FIG. 5(A), the s-polarized light, reflected from the polarizing means of the light valves, enter from a light-emitting surface without a polarization converting film 381, are reflected by the reflecting film 332b, transmit through the polarized light separating film 331a which reflects p-polarized light, are reflected by the reflecting film 332a, and then reflected by the light-shielding section 341, after which they leave and travel back towards the liquid crystal light valves through the same optical paths. As the light beams are reflected, however, at least some of the s-polarized light are changed to p-polarized light which can be used. The s-polarized light beams, which have returned to the polarization converting film 381, are converted into p-polarized light beams thereby, and transmit through the polarized light separating film 331a and travel towards the light source therefrom. These light beams are reflected by the reflector of the light source 200 and are collimated, which return back towards the polarization beam splitter array. Therefore, it is possible to convert into the polarization axis of the light-incident side polarizing means, as a result of which the light can be used more efficiently, allowing most of the light from the light source to be used for projection.

In the polarization beam splitter array of FIG. 5(B), the s-polarized light beams, reflected from the polarizing means of each of the light valves, enter a light-emitting surface 326 without a polarization converting film 381, are reflected by the reflecting film 332b and the polarized light separating film 331 which reflects s-polarized light, thereby returning back to the light source section. The s-polarized light beams, which have returned to the polarization converting film 381, are converted into p-polarized light thereby, and transmit through the polarized light separating film 331 and are directed towards the light source therefrom. These light beams are reflected by the reflector of the light source 200 and collimated, and return back to the polarization beam splitter array. Therefore, it is possible to convert the light beams into the polarization axis of the light-incident side polarizing means, as a result of which the light can be used more efficiently, allowing most of the light from the light source to be used for projection.

As can be understood from the foregoing description, at least the light-incident side polarizing means of each liquid crystal light valve transmits one of two types of polarization axis component light beams and reflects the other of the two types of polarization axis component light beams, so that heat produced at each of the light-incident side polarizer is greatly reduced. Forming each of the light-emitting side polarizing means using a reflecting polarizer, as is the case when each of the light-incident side polarizing means is formed, greatly reduces the amount of heat produced at each of the light-emitting side polarizing means, as has been described in Embodiment 1, and allows light to be used with even greater efficiency. Since each of the polarizing means is a multi-layered film, like the one illustrated in FIG. 7, a conventional polarizer only needs to be replaced, so that the size of the optical system does not become large. In addition, since there is a sharp decrease in the amount of heat produced, a cooling means can be eliminated or the cooling mechanism can be simplified since it is no longer necessary to devise the cooling means in such a way as to increase its cooling efficiency. In addition, such a reflecting polarizer can be adhered closely to or bonded to the outer surface of each of the substrates of the liquid crystal panels.

The multi-layered films are disposed such that light beams impinge from a direction perpendicular to their corresponding film surfaces. This allows the reflecting light beams of the other type of polarization axis component to be reflected towards the light source along the optical axis of the incident light beams. Therefore, the light beams, reflected at the light source, can be guided again to the light-incident side polarizing means along the same optical axis. Consequently, the light, reflected by the films, can be used with even greater efficiency. In particular, since, in the present embodiment, the light beams, which are collimated by the light-emitting side lens 237, illuminate the light-incident side polarizing means, the reflected light beams are reflected along the optical axis of the polarizing illuminating optical system 201, so that light beams do not easily leak out.

In the foregoing description, the polarization axis and the reflecting axis of the light-incident side polarizing means may be set so as to allow transmission of the s-polarization axis and reflection of the p-polarization axis. In addition, the polarization axis leaving the polarization converter may be set so as to be aligned with the s-polarization axis. Further, obviously, the polarizing axis and the absorption axis (or reflection axis) of the light-emitting side polarizing means may be set opposite to the aforementioned setting. Still further, the reflecting polarizer employed in the present invention may be formed so as to possess the wavelength selective transmission characteristics such as those of Embodiment 1. In that case, the structure and the operation of each polarizing means are the same as those of Embodiment 1.

The present invention is not limited to the above-described embodiment and forms, so that various modifications can be made without departing from the scope of the present invention, as described below.

For example, when the projection-type display apparatus of the present invention is used for projecting a black-andwhite image, only one liquid crystal panel and one pair of polarizing means are required, so that the color separating means for separating the luminous flux into three color light components, and the color synthesizing means for synthesizing the three color components can be eliminated. On the other hand, when a color filter which transmits three primary color lights is provided at the inside surface of one liquid crystal panel in order to display a color image using a single liquid crystal panel, a color image can be displayed using only one liquid crystal panel and one pair of polarizing means.

In the present embodiment, although each of the light-incident side polarizing means and each of the light-emitting side polarizing means were bonded to the outer surface of their respective substrates of their respective liquid crystal panels, both or either one of the light-incident side polarizing means and the light-emitting side polarizing means may be spaced from its associated liquid crystal panel. In that case, a holding member for holding each of the polarizing means must be additionally provided. Even when one or both of the polarizing means are spaced from the liquid crystal panel associated thereto, each of the polarizing means must be disposed so that light vertically enters the light-incident surface of each polarizing means.

In the present embodiment, the optical paths followed by the color light beams for separation and combination are not limited to those of the present embodiment, so that, for example, the color light which passes through the light guiding means 222 may be the red light.

[Embodiment 4]

Figure 4:
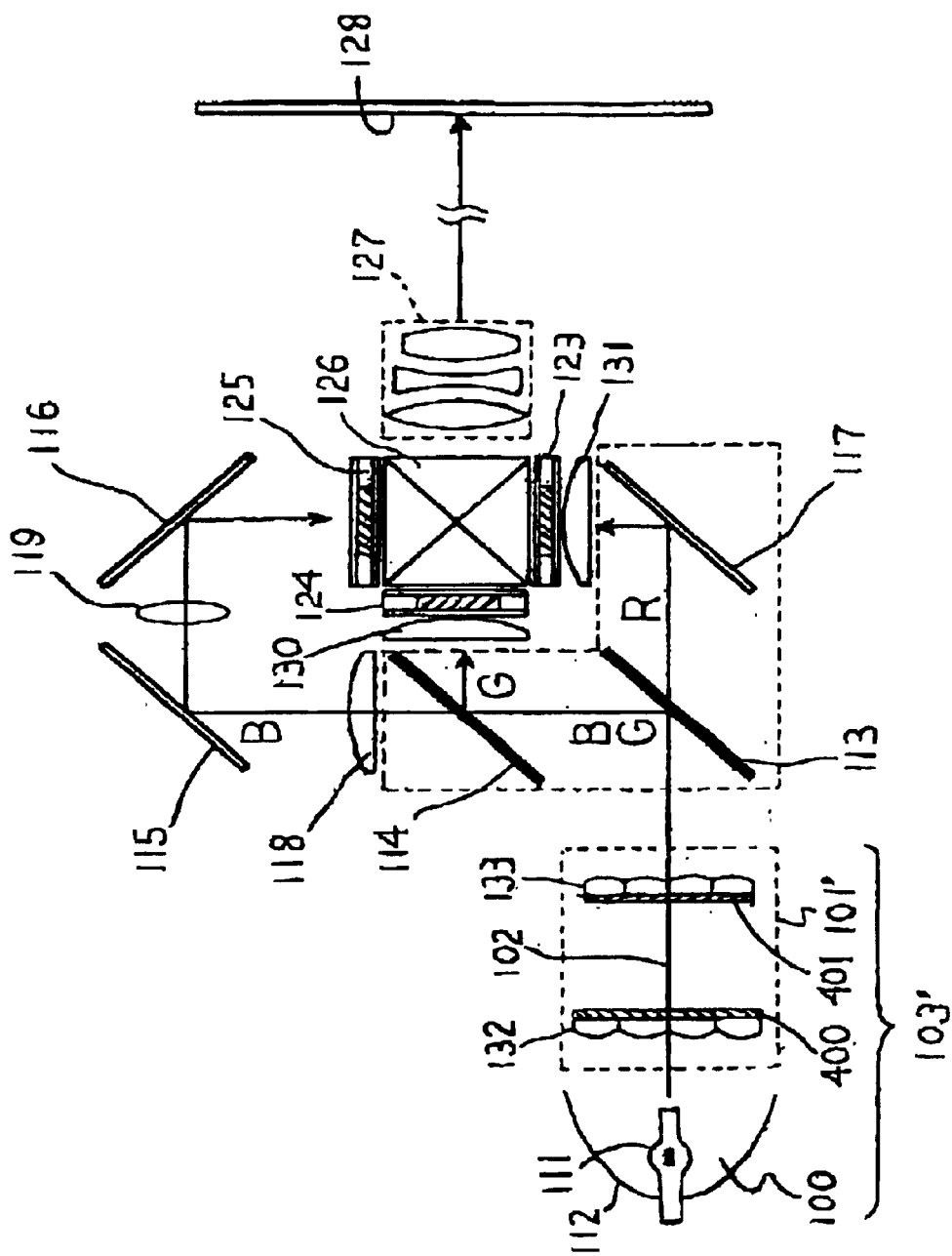
FIG. 4 is a view showing the structure of the projection-type display apparatus of Embodiment 4 in accordance with the present invention.

A description will now be given of Embodiment 4, with reference to the drawings. FIG. 4 is a schematic structural view of the main portion of the projection-type display apparatus of the present embodiment. The basic structure of the projection-type display apparatus of the present embodiment is similar to that of Embodiment 2. It differs from Embodiment 2 in that it includes an illuminating optical system 103' in which a ¼ wavelength plate 400 and a reflective polarizing means 401 are interposed in an optical path between a light source 100 and a first dichroic mirror 113 being a color separating means, with the reflective polarizing means 401 transmitting one of two types of polarization axis component light beams and reflecting the other of the two types of polarization axis component light beams. In the present embodiment, unless otherwise specified, the structures and operations of component parts other than those of the ¼ wavelength plate 400 and the polarizing means 401 are essentially the same as those of the corresponding parts of Embodiment 2.

The ¼ wavelength plate 400 and the polarizing means 401 of the present embodiment have the following operations.

Light beams from a light source lamp 111 are randomly polarized light beams. The light beams are collimated as a result of being reflected by a reflecting mirror (reflector), disposed behind the lamp 111, towards the ¼ wavelength plate 400. The ¼ wavelength plate 400 is capable of converting the polarization axis of the light beams emitted from the light source 100 to that of elliptic polarized light beams. Although the light beams, which have transmitted through the ¼ wavelength plate 400, are converted into elliptic polarized light beams, they are still in a randomly polarized state. These light beams then enter the reflective polarizing means 401. The reflective polarizing means 401 is composed of a multi-layered film, like the one described above with reference to FIG. 7. Accordingly, of the randomly polarized light beams from the light source, the reflective polarizing means 401 transmit one of two types of polarization axis component light beams (such as p-polarized light beams) and reflect the other of the two types of polarization axis component light beams (such as s-polarized light beams).

The reflected polarization axis component light beams (such as s-polarized light beams) of the other type transmit once again through the ¼ wavelength plate 400 and are converted into elliptic polarized light beams. Then, the elliptic polarized light beams, which have transmitted through the ¼ wavelength plate 400 and traveled back towards the light source 100, are reflected by the reflector 112 and collimated which impinge again upon the ¼ wavelength plate 400. The elliptic polarized light beams transmit through the ¼ wavelength plate 400 and are, this time, converted into the one type of polarization axis component light beams (such as p-polarized light beams). Accordingly, the light beams, reflected by the polarizing means 401, are converted into polarization axis component light beams of the polarizing means 401 as a result of transmitting through the ¼ wavelength plate 400 twice via the reflector 100.

The ¼ wavelength plate 400 is adhered closely to or bonded to the planar side of a first lens plate 132 of a uniform illuminating optical system 101', and the multi-layered film of the polarizing means 401, is adhered closely to or bonded to the planar side of a second lens plate 133. Using a lens plate to hold each of the wavelength plate and the polarizer eliminates the need for using a special holding member.

By disposing a ¼ wavelength plate 400 and a reflective polarizing means 401 in front of the color separating means, the polarization axes of the light beams can be aligned, at the front of the color separating means. Although a longer optical path reduces the amount of reflected light from the polarizing means, so that the light is used with low efficiency, in the present embodiment the distance between the polarizing means 133 and the reflector 112 is short, allowing more efficient use of the light as a result of reducing the amount of loss of the light.

According to the present invention, the light beams reflected from the polarizing means travel back towards the light valves by being reflected at the light source. In such a case, the light source section must be constructed so as to comprise (1) a reflector of the light source section including a parabolic reflecting mirror which reflects the light beams returning back from the separating means as substantially collimated light beams, or (2) a reflecting mirror, such as a spherical reflector which reflects the light beams returning back from the separating means, and a condensing means such as a condenser lens which causes the light beams from the reflecting mirror to be condensed and concentrated as substantially collimated light beams and travel towards the first lens plate 132.

In the present embodiment, if the polarization state from the polarizing means 133 is good, the light-incident side polarizer of the liquid crystal light valves 123, 124, and 125 may be eliminated. However, since the light beams pass through the color separating means 113 and 114, the reflecting mirrors 115, 116, and 117, and the like, the polarization axes tend to be converted, making it desirable to dispose a polarizing means in front of the liquid crystal panels of the respective liquid crystal light valves in order to align the polarization axes with the polarizing means 401. The polarizing means at the liquid crystal panel valve sides may be either an absorptive-type polarizer which absorbs the other of the two types of polarization axis component, as has been conventionally the case, or a reflecting polarizer described up to this point. When a reflecting polarizer is also provided adjacent to the liquid crystal light valves, the polarization axis component light beams which do not transmit therethrough transmit through the polarizing means 133, and are converted into polarization axis which can be used again by the action of the ¼ wavelength plate 400 thereby increasing the efficiency with which the light is used.

In the foregoing description, the polarization axis and the reflection axis of the polarizing means may be set so as to allow transmission of s-polarization axis and reflection of p-polarization axis, or they may be set opposite to this setting. In addition, the light-incident side reflecting polarizer adjacent to the liquid crystal light valve side used in the present embodiment may possess the wavelength selective transmission characteristics such as those of Embodiment 1. In that case, the structures and operations of the polarizing means are similar to those of Embodiment 1.

The polarizing means 401, itself, may possess a wavelength selective transmission characteristic. In the projection-type display apparatus, the ultraviolet ray component included in the light of the light source deteriorates the properties of the polarizer which absorbs ultraviolet component, and the infrared component is converted into heat at the polarizer which absorbs it. Therefore, as described in the Embodiment 1 section, the thickness of the multi-layered film forming the polarizing means 401 may be set such that transmission light beams fall within the visible region and ultraviolet and/or infrared wavelength bands are reflected.

The present invention is not limited to the above-described embodiment and forms, so that various modifications can be made without departing from the scope of the present invention, as described below.

For example, when the projection-type display apparatus of the present invention is used for projecting a black-and-white image, only one liquid crystal panel and one pair of polarizing means projection-type display are required, so that the color separating means for separating luminous flux into three color light components from light, and the color synthesizing means for synthesizing three color light components can be eliminated. On the other hand, when a color filter which transmits three primary color lights is provided at the inside surface of the one liquid crystal panel in order to display a color using a single liquid crystal panel, a color image can be displayed using only one liquid crystal panel and one pair of polarizing means.

In the present embodiment, although each of the light-incident side polarizing means and each of the light-emitting side polarizing means were bonded to the outer surface of their substrates of their respective liquid crystal panels, both or either one of the light-incident side polarizing means and the light-emitting side polarizing means may be spaced from its associated liquid crystal panel. In that case, a holding member for holding each of the polarizing means must be additionally provided. Even when one or both of the polarizing means are spaced from the liquid crystal panel associated thereto, each of the polarizing means must be disposed so that light vertically enters the light-incident surface of each polarizing means.

The order in which the color light beams is separated, the method of color separation, and the optical paths followed by the color light beams for combination are not limited to those of the present embodiment, so that, for example, the color light which passes through the light guiding means may be the red light.

[Embodiment of Liquid Crystal Panel]

Figure 11:
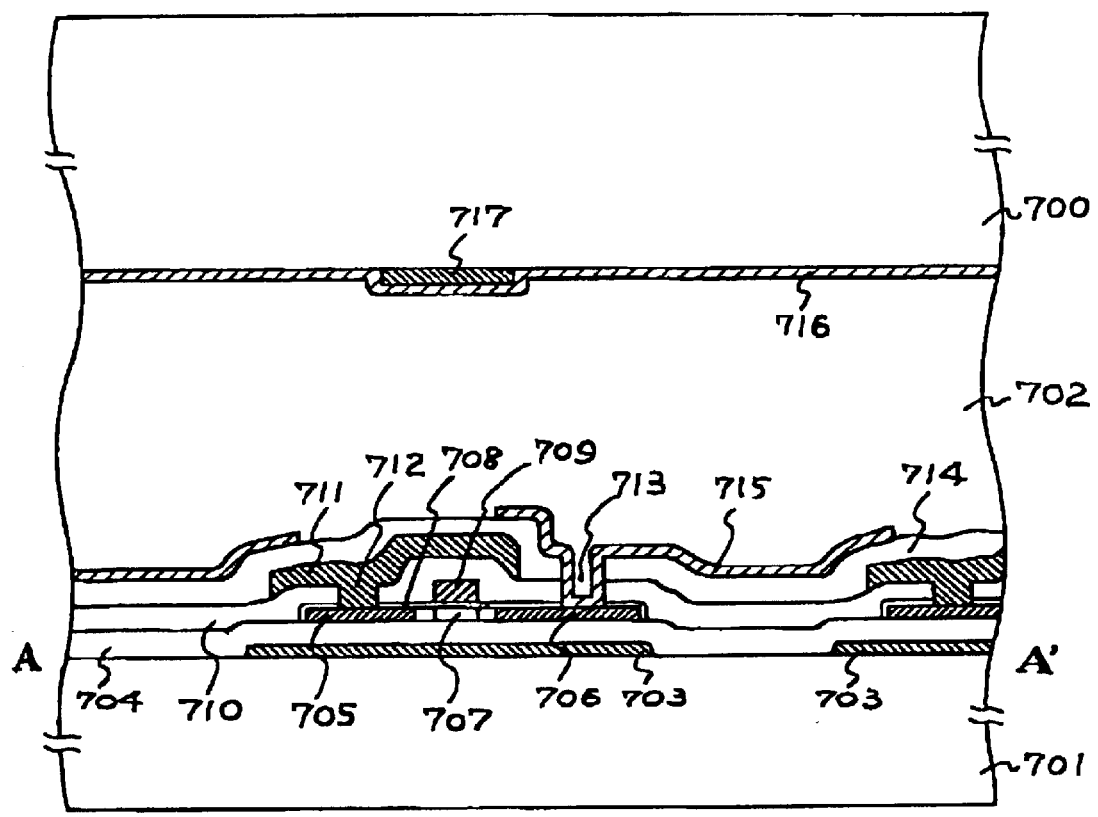
FIG. 11 is a cross sectional view of a liquid crystal panel in accordance with the present invention.
Figure 12:
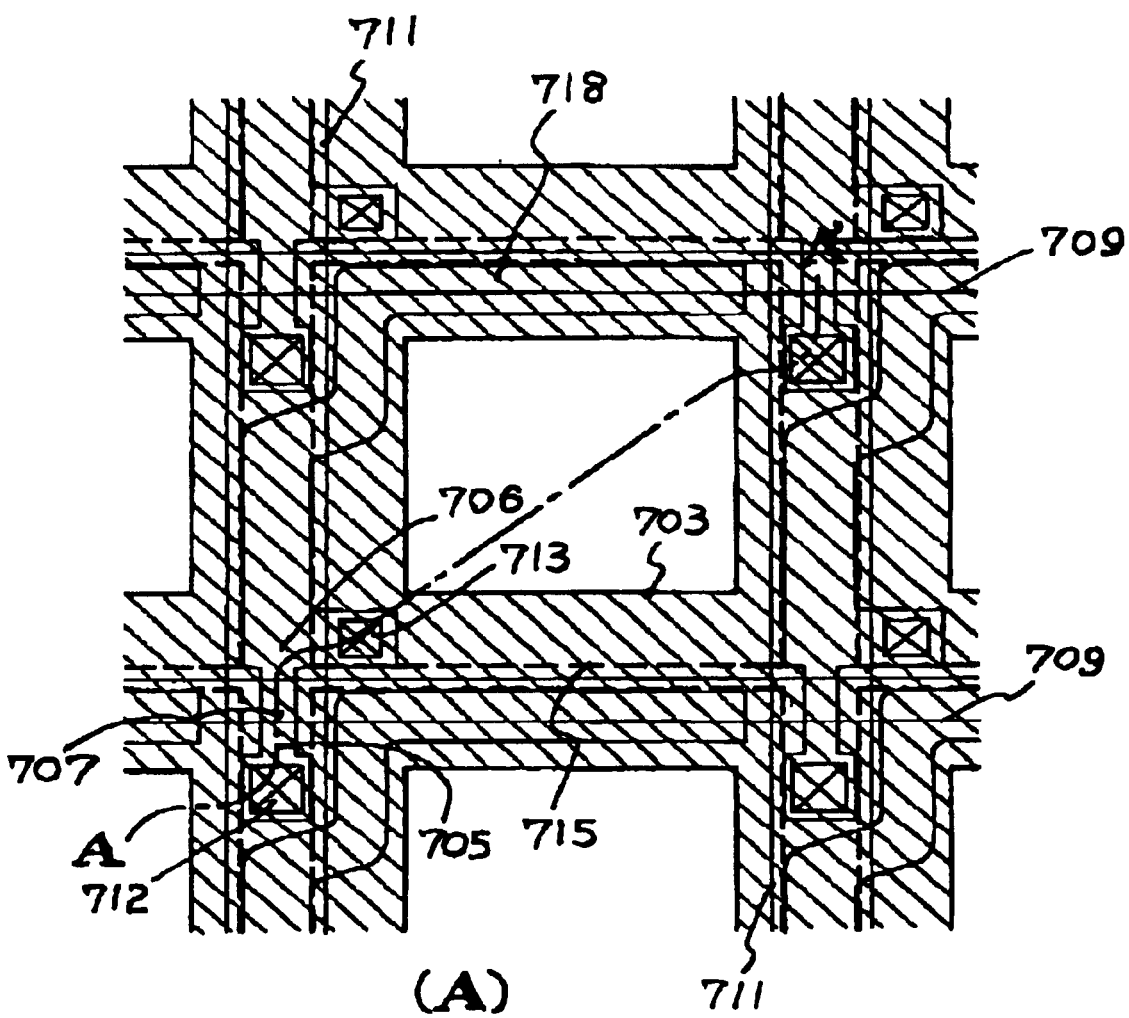
Figure 12:
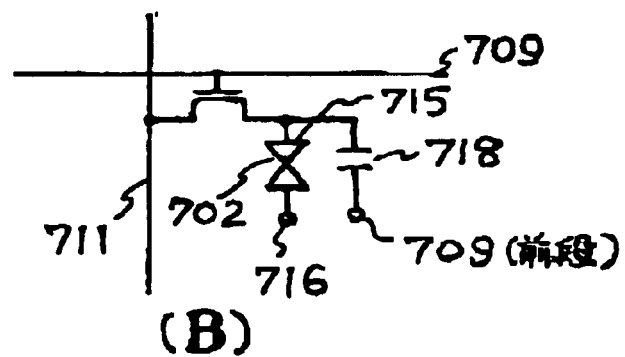

A description will now be given of an embodiment of a liquid crystal panel used in the liquid crystal light valve of Embodiments 1 to 4. FIG. 11 is a sectional view of the respective liquid crystal panel, and FIG. 12(A) is a plan view of a light-emitting side substrate used for the respective liquid crystal panel. FIG. 11 is a sectional view taken along line A–A' of FIG. 12(A). A feature of the present embodiment is the formation of a light-shielding film 703, provided on the lower layer of a thin film transistor, on a light-emitting side substrate 701 of the liquid crystal panel.

In FIG. 11, a liquid crystal 702, such as a TN type, used for the respective liquid crystal panel, is sandwiched between a light-incident side substrate 700 and a light-emitting side substrate 701. Liquid crystal types other than the TN type may be appropriately used, which include the homogenious alignment type, the homeotropic alignment type, the high-polymer diffusion type, and the memory type such as ferroelectricity. The light-shielding films 703, formed of a metal such as chromium, titanium, or the like, are formed into a matrix arrangement on an inside surface of the light-emitting side substrate 701; a first interlayer insulating film 704, made of silicon nitride, silicon oxide, or the like, is formed on the entire top surfaces of the light-shielding films 703; and island-shaped silicon layers, made of polycrystalline silicon or amorphous silicon, are formed on top of the first interlayer insulating film 704. The silicon layers later become channels 707, sources 705, and drains 706. A gate insulating film 708, being a silicon oxide film, is formed on the surface of each silicon layer by thermal oxidation, CVD, or the like; and gate electrodes 709 are formed opposing their respective channels 707. The gate electrodes 709 serve as scanning lines formed in a matrix arrangement on the pixel areas of the liquid crystal panel, and are made of, for example, a polycrystalline silicon, or a metal such as aluminum or tantalum. In the case where polycrystalline silicon is used, a high-melting metal is placed on the polycrystalline silicon.

In the figure, a metal is used for each gate electrode 709. After covering each gate electrode with an insulating film formed by anodizing the surface of the associated gate electrode 709, the gate electrodes and the films formed by anodization are used as masks in order to inject impurity ions into each silicon layer and form source 705 and drain 706 by self-alignment. Previously forming an area with a low impurity density in each silicon layer between the channel 707 and the source 705 and the drain 706 of the associated transistor, using the associated source and drain, results in the formation of a LDD structure. As mentioned above, a thin-film transistor, being a switching element, is formed for every pixel.

A second interlayer insulating film 710, formed of silicon nitride, silicon oxide, or the like, is formed on the entire surfaces of the thin film transistors. Contact holes 712 are formed here, with a data signal line 711, formed of a metal such as aluminum, being connected to its associated source 705 through its associated contact hole 712. A third interlayer insulating film 714, made of silicon nitride, silicon oxide, or the like, is formed, with contact holes 713 being formed at the same time in the second and third interlayer insulating films. A pixel electrode 715, formed of a transparent conducting film such as ITO, is formed so as to be connected with its associated drain 706 through its associated contact hole 713. Although not shown, an alignment layer is thereafter formed as the topmost layer which is rubbed.

On the other hand, light-shielding films 717, made of a metal such as chromium or black resin, are formed on the inside surface of the light-incident side substrate 700. The light-shielding film 717 can be formed inwardly, in a plane, from each light-shielding film 703 on the light-emitting side substrate 701 and into a matrix arrangement. An opposing electrode 716, composed of a transparent electrically conductive film such as ITO, is formed above the entire surfaces of the light-shielding films 703. Although not shown, an alignment film is thereafter formed as the topmost layer which is rubbed.

In the liquid crystal panel, the scanning lines 709 and the data signal lines 711 are formed in a matrix arrangement, with a thin film transistor (hereinafter referred to as "TFT"), and a pixel electrode 715 formed for every pixel. A gate electrode is connected to its associated scanning line, and each source 705 is connected to its associated data signal, and each pixel electrode 715 is connected to the drain 706 of its associated TFT. At each pixel, a data signal is supplied from each data signal line to its associated pixel electrode 715, with each TFT serving as a switching element, and a voltage is applied to the liquid crystal layer 702 interposed between the pixel electrode 715 and the opposing electrode 716, whereby the orientations of the liquid crystal molecules are controlled in accordance with the applied voltage. At each pixel, even in the non-selective period in which a TFT does not conduct electricity, a storage capacitor 718 can be formed between non-selective potentials by making the silicon layer of each drain 706 extend to a location which allows the voltage applied to the liquid crystal to be kept thereat, and placing each front scanning line 709 through its associated gate insulating film, (with the front scanning line 709 being the scanning line to which a selective potential has been applied during a previous horizontal scanning period. From the time of selection of the present pixel to the vertical scanning period, the non-selective potential is maintained). It is to be noted that each storage capacitor 718 may be formed by providing capacity lines formed at locations parallel to the scanning lines, and using its associated pixel electrode 715 opposing these capacity lines through an interlayer insulating film.

In the liquid crystal panel described above, when light impinges, in particular, upon the channel 707 of a TFT, TFT leakage occurs even during the electrically non-conductive state (or the non-selective state). When a leakage occurs, the accumulated charge discharges through the TFT, changing the voltage applied to the liquid crystal. This greatly reduces the contrast of the liquid crystal panel. In the description of the light valves of the above-described Embodiments 1 to 4, reflecting polarizers were used for the light-emitting side polarizing means. In that case, the light-emitting side polarizers are constructed to transmit either one of two types of polarization axis light beams (s-polarized light beams in the above-described embodiments) and reflect the other of the two types of polarization axis light beams (p-polarized light beams in the above-described embodiments). s-polarized light beams as well as p-polarized light beams enter the light-emitting side polarizer in accordance with the voltage applied to the liquid crystal of the respective pixels, so that the amount of reflected light from the polarizer is increased. When the light enters a TFT, liquid crystal panel characteristics deteriorate.

In the present embodiment, a light-shielding film 703 is formed at the light-emitting side of each thin film transistor to prevent light reflected from each reflective polarizing means at the light-emitting side from impinging upon each TFT. Therefore, the light reflected from each light-emitting side polarizing means travels through each liquid crystal layer 702 via the opening in its associated light-shielding film 703 and back to the light-emitting side of its corresponding liquid crystal panel. Each TFT is shielded from light at the light-incident side by a light-shielding film 717 on the substrate 700 associated thereto, and a data line 711 which overlaps its associated TFT. Therefore, each TFT is shielded both from the light-incident side and the light-emitting side. In addition, in the present embodiment, each TFT is constructed as a top gate, which allows light to easily enter its associated channel from the light-emitting side, so that each light-shielding film 703 is made wider than the light-shielding layer 717 and the data line 711 that shields the light shielding film 703 from above the TFT.

By virtue of the above-described liquid crystal panel structure, it is possible to use a reflecting polarizer, such as that described in each of the embodiments, for the light-emitting side polarizing means emitting side of the liquid crystal panel of liquid crystal light valves.

FIG. 12(B) is an equivalent circuit diagram of a pixel in each of the above-described liquid crystal panel. When it is time for pixel scanning period, a TFT is selected based on the scanning signal supplied to a scanning line 709 from a scanning side driver (not shown), and the selected TFT becomes electrically conductive. An image signal to be written on the selected pixel is supplied from a data line side driver (not shown), and the image signal voltage is applied to the liquid crystal 702 and the storage capacitor 718 through the electrically conductive TFT. Thereafter, when the TFT is set at a non-selective state and no longer conducts electricity, the application of voltage to the liquid crystal 702 is continued until the next scanning period, based on the amount of charge held by the liquid crystal 702 and the storage capacitor 718. As mentioned above, the storage capacitor 718 may be formed between capacity lines, formed specifically for the formation of the storage capacity 718.

Although not shown, the light-incident side polarizer and/or the light-emitting side polarizer are either adhered closely to or bonded to the outer surface of the substrate 700 and/or the substrate 701.

[Other Embodiments]

In each of the foregoing embodiments, the settings of the polarization axes are not limited to those mentioned above, so that appropriate settings may be made within the scope of the present invention.

In each of the above-described embodiments, instead of being formed by a multi-layered film, the polarizing means may, for example, be of the type consisting of a cholesteric liquid layer sandwiched between a λ/4 plate, the type making use of Brewster's angle (refer to pp. 427 to 429 in SID 92 DIGEST), or the type utilizing a hologram. These types are known to function similarly to the multi-layered films described in the aforementioned embodiments.

There are two types of projection-type display apparatuses. They are front projection-type display apparatuses which project from the side the projection surface is observed, and rear projection-type display apparatuses which project from the side opposite to the direction in which the projection surface is observed. The projection-type display apparatuses of the above-described embodiments may be either of these two types.

As can be understood from the foregoing description, according to the present invention, unlike conventional polarizers, the polarizing means provided on the liquid crystal panel of each liquid crystal valve of the projection-type display apparatus does not absorb light and generate heat, making it possible to prevent deterioration in polarizing characteristics of the polarizers and heat from affecting the liquid crystal panels. The polarizing means, which is a multi-layered film, does not increase the size of the optical system. In addition, since the amount of heat generated is greatly reduced, the cooling means can be eliminated, or the cooling mechanism can be simplified, since it is no longer necessary to devise the cooling means in such a way as to increase the cooling efficiency. Further, light reflected by the film is reflected again by the light source side, allowing the light to be used more efficiently.

INDUSTRIAL APPLICABILITY

According to the projection-type display apparatus, such as a projector including a liquid crystal panel and a polarizer, conventional polarizers of the type that absorb non-transmissive polarization axis component light beams can be used, replaced by polarizers of the type that reflect non-transmissive polarization axis component light beams.

What is claimed is:

1. A projector, comprising:

a light source;

a light valve that modulates light beam from the light source, the light valve including a liquid crystal panel having a plurality of pixels, a first polarizer provided on a light-incident side of the liquid crystal panel and a second reflective polarizer provided on a light-emitting side of the liquid crystal panel, the second reflective polarizer being formed of a multi-layered film transmitting one of a first polarized light and a second polarized light among incident light beam and reflecting the other of the first polarized light and the second polarized light among the incident light beam, the liquid crystal panel being formed by sandwiching a liquid crystal between a first substrate provided on a light-incident side and a second substrate provided on a light-emitting side, and the liquid crystal panel including a plurality of switching elements formed on an inner side of the second substrate, and a light-shielding layer formed between the switching element and a surface of the second substrate; and a projection optical system that projects the light beam modulated by the light valve, the first polarizer transmitting the first polarized light among incident light beam, the liquid crystal panel modulating the first polarized light transmitted through the first polarizer by the pixels and transmitting the modulated light toward the second reflective polarizer, the second reflective polarizer transmitting a part of the incident light beam modulated by the pixels of the liquid crystal panel and reflecting the other part of the incident light beam modulated by the pixels of the liquid crystal panel as a reflected light, the reflected light reflected by the second reflective polarizer being transmitted through the pixels of the liquid crystal panel toward the light source, the multi-layered film, provided on at least one side of a corresponding liquid crystal panel, being formed of alternately laminated layers of first films and second films, the first films having a refractive index in a first axial direction of a film surface which differs from a refractive index in a second axial direction perpendicular thereto, and the second films having a refractive index in the first axial direction and the second axial direction which are substantially equal to the refractive index of the first films in the second axial direction, and the first and second films having thickness set to allow selective transmission of the colored light beam which enters the first films and the second films, and a plurality of the multi-layered films of the light valves having different thickness from each other.

2. The projector according to claim 1, the first polarizer transmitting the first polarized light and reflecting the second polarized light.

3. The projector according to claim 1, the reflected light reflected by the second reflective polarizer being re-reflected so as to be included in the incident light beam on the first polarizer.

4. The projector according to claim 3, the reflected light reflected by the second reflective polarizer being reflected by a reflector of the light source.

5. The projector according to claim 3, further comprising a polarization converter that aligns the light beam from the light source with light beam having one of the polarized lights, the reflected light reflected by the second reflective polarizer being reflected by a reflector of the light source or by the polarization converter.

6. A projector, comprising:

a light source;

a light valve that modulates light from the light source, the light valve including a liquid crystal panel and a reflective polarizer provided at least on a light-emitting side of the liquid crystal panel, the liquid crystal panel being formed by sandwiching a liquid crystal between a first substrate provided on a light-incident side and a second substrate provided on a light-emitting side; and a projection optical system that projects the light modulated by the light valve, the reflective polarizer being formed of a multi-layered film transmitting one of a first polarized light and a second polarized light among incident light, and reflecting the other of the first polarized light and the second polarized light among the incident light so as to return toward the second substrate and the liquid crystal panel, the liquid crystal panel comprising a plurality of pixels having a switching element formed on an inner side of the second substrate, and a light-shielding layer formed between the switching element and a surface of the second substrate, the multi-layered film, provided on at least one side of a corresponding liquid crystal panel, being formed of alternately laminated layers of first films and second films, the first films having a refractive index in a first axial direction of a film surface which differs from a refractive index in a second axial direction perpendicular thereto, and the second films having a refractive index in the first axial direction and the second axial direction which are substantially equal to the refractive index of the first films in the second axial direction, and the first and second films having thickness set to allow selective transmission of the colored light beam which enters the first films and the second films, and a plurality of the multi-layered films of the light valves having different thickness from each other.

7. The projector according to claim 6, the reflective polarizer being either adhered to or bonded to the substrate of the liquid crystal panel.

8. The projector according to claim 6, a light returned toward the second substrate and the liquid crystal panel being re-reflected so as to be included in incident light on the light valve.

9. The projector according to claim 8, a light reflected by the reflective polarizer reflected by a reflector of the light source.

10. The projector according to claim 8, further comprising a polarization converter that aligns the light from the light source with light having one of the polarized light, a light reflected by the reflective polarizer being reflected by a reflector of the light source or by the polarization converter.

11. A projector, comprising:

a light source;

a colored-light separator that separates light beam from the light source into a plurality of colored light beams different from each other;

a plurality of light valves that modulate the colored light beams separated by the colored-light separator, each of the light valves including a liquid crystal panel and a reflective polarizer provided on at least one side of the liquid crystal panel associated thereto, the reflective polarizer being formed of a multi-layered film that transmits one of a first polarized light and a second polarized light among incident colored light beam and reflects the other of the first polarized light and the second polarized light among the incident colored light beam;

a synthesizing optical element that synthesizes the colored light beams modulated by the plurality of light valves; and a projection optical system that projects the light beam synthesized by the synthesizing optical element, at least one of the reflective polarizers having wavelength selective transmission characteristic different from the other of the reflective polarizers so as to selectively transmit the incident colored light beam separated by the colored-light separator and modulated by an associated light valve, the multi-layered film, provided on at least one side of a corresponding liquid crystal panel, being formed of alternately laminated layers of first films and second films, the first films having a refractive index in a first axial direction of a film surface which differs from a refractive index in a second axial direction perpendicular thereto, and the second films having a refractive index in the first axial direction and the second axial direction which are substantially equal to the refractive index of the first films in the second axial direction, and the first and second films having thickness set to allow selective transmission of the colored light beam which enters the first films and the second films, and a plurality of the multi-layered films of the light valves having different thickness from each other.

12. The projector according to claim 11, the light valves further comprising a second reflective polarizer provided on the other side of the liquid crystal panel associated thereto, the second reflective polarizer being formed of the multi-layered film that transmits one of the first polarized light and the second polarized light and reflects the other of the first polarized light and the second polarized light.

13. The projector according to claim 11, light reflected by the reflective polarizer being re-reflected so as to be included in the incident colored light beam on the reflective polarizer.

14. The projector according to claim 13, a light reflected by the reflective polarizer being reflected by a reflector of the light source.

15. The projector according to claim 13, further comprising a polarization converter that aligns the light beam from the light source with light beam having one of the polarized lights, a light reflected by the reflective polarizer being reflected by a reflector of the light source or by the polarization converter.

* * * * *